(12) United States Patent
Nakazato et al.

(10) Patent No.: US 8,098,988 B2
(45) Date of Patent: Jan. 17, 2012

(54) OPTICAL ADD/DROP MULTIPLEXER

(75) Inventors: Hiroaki Nakazato, Kawasaki (JP);
Hiroyuki Hanazawa, Kawasaki (JP);
Takashi Okuda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 597 days.

(21) Appl. No.: 12/318,321

(22) Filed: Dec. 24, 2008

(65) Prior Publication Data
US 2009/0297149 A1     Dec. 3, 2009

(30) Foreign Application Priority Data

May 28, 2008   (JP) ................. 2008-140060

(51) Int. Cl.
*H04B 10/08* (2006.01)
*H04B 10/14* (2006.01)
*G02B 6/04* (2006.01)
(52) U.S. Cl. ............... 398/25; 398/32; 398/33
(58) Field of Classification Search ............ 398/25, 398/32, 33
See application file for complete search history.

(56) References Cited

U.S. PATENT DOCUMENTS 6,539,151 B2 * 3/2003 Fajardo et al. ............ 385/114
6,990,294 B2 * 1/2006 Ikoma et al. ................ 398/16

FOREIGN PATENT DOCUMENTS

JP    2002-223197    8/2002
JP    2005-026899    1/2005

* cited by examiner

*Primary Examiner* — Danny Leung
(74) *Attorney, Agent, or Firm* — Staas & Halsey LLP

(57) ABSTRACT

A disclosed optical add/drop multiplexing device demultiplexes a first signal into multiple signals according to wavelengths, drops one or more of the demultiplexed signals to a transponder, adds one or more signals output from the transponder, multiplexes these signals into a second signal, and outputs it. The device includes an injecting unit for injecting one of measurement signals, each of whose wavelength corresponds to that of a different demultiplexed signal, into a core of a multicore cable within the device, the core being used to transmit the different demultiplexed signal having the corresponding wavelength; a preventing unit for preventing the one measurement signal from emanating; a measuring unit for measuring, for each wavelength, levels of the one measurement signal before and after the corresponding core; a calculating unit for calculating loss of the corresponding core, based on the measured levels; and an informing unit for reporting the calculated loss.

6 Claims, 19 Drawing Sheets

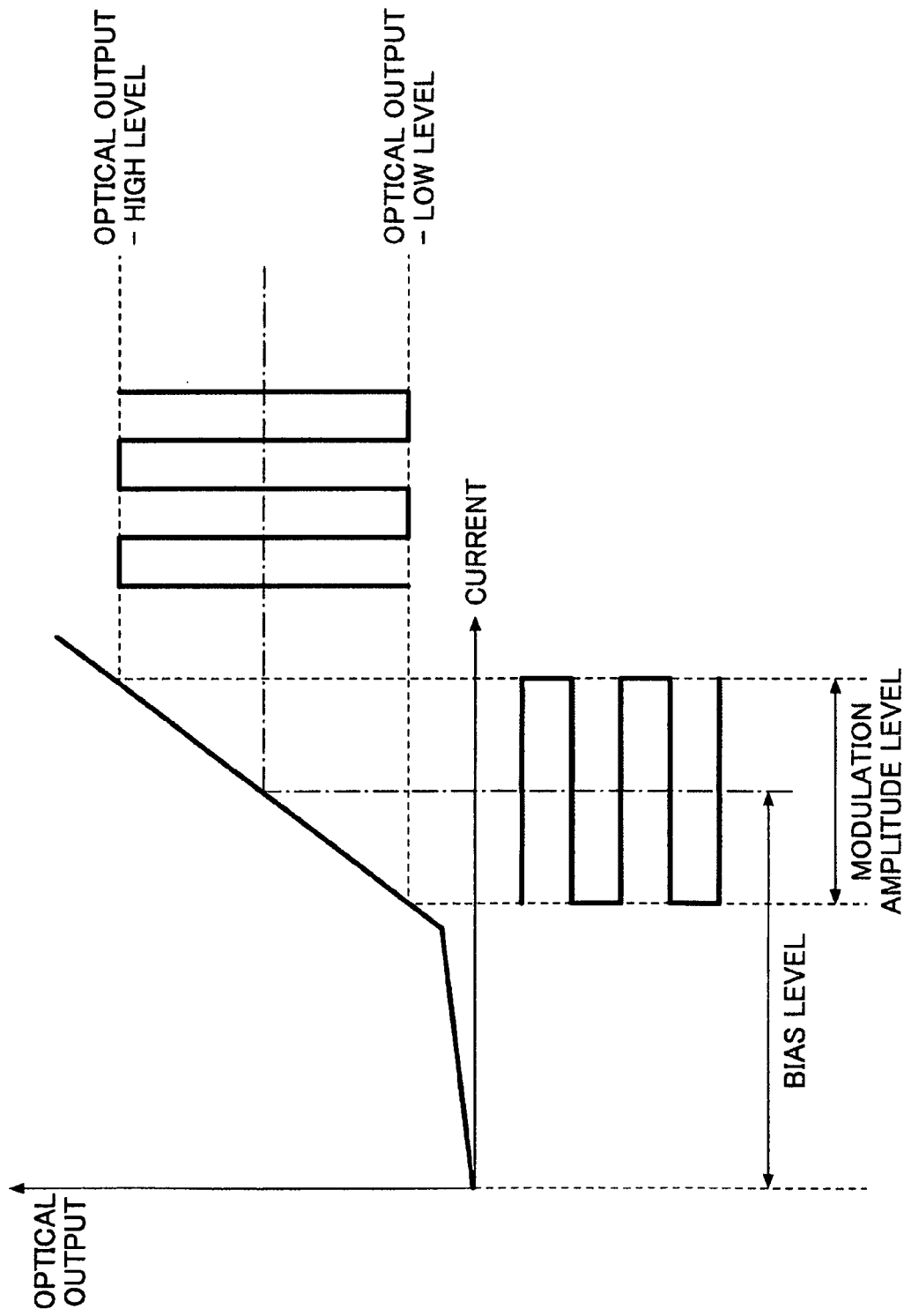

FIG.9B
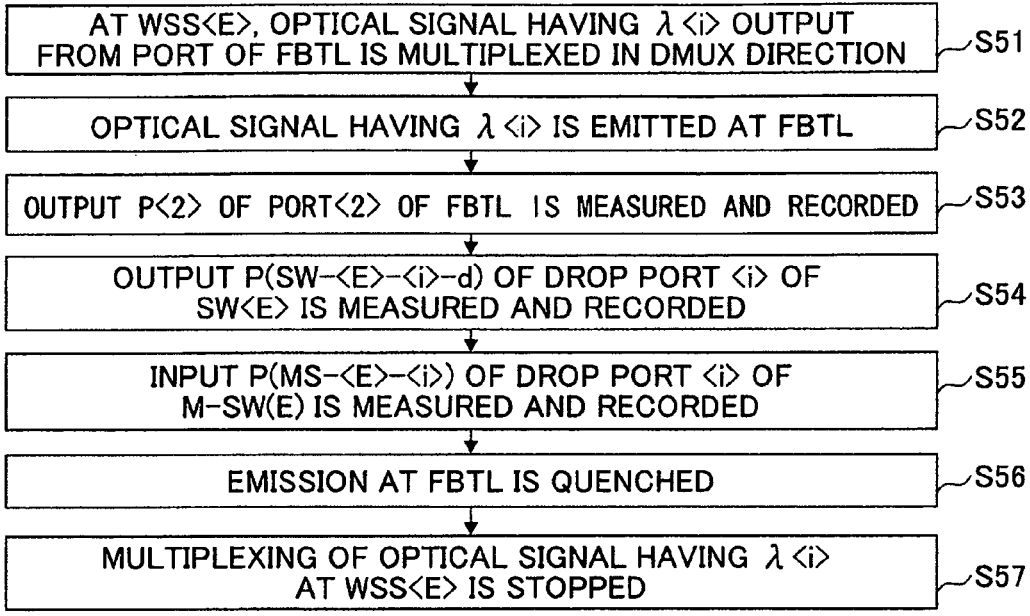
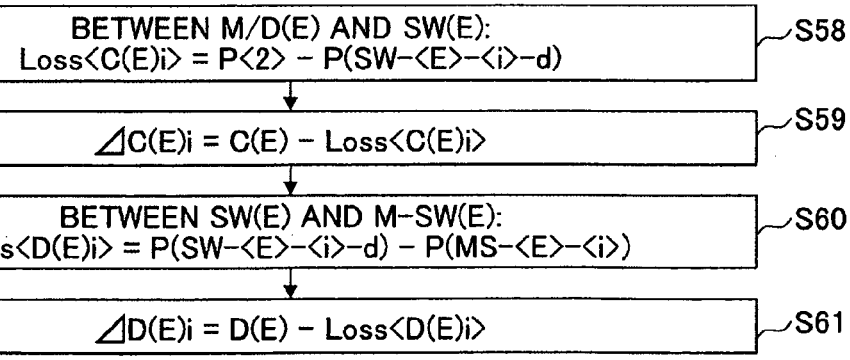

OPTICAL ADD/DROP MULTIPLEXER

CROSS-REFERENCE TO RELATED APPLICATIONS

This application is based upon and claims the benefit of priority of Japanese Patent Application 2008-140060, filed on May 28, 2008, the entire contents of which are hereby incorporated herein by reference.

FIELD

The disclosures herein are directed to an optical add/drop multiplexer used in an optical communications system.

BACKGROUND

FIGS. 1A through 1C show representative structures of optical add/drop multiplexers used in optical communications systems, such as WDM (Wavelength Division Multiplexing) and PXC (Photonic Cross Connect).

FIG. 1A shows a structural example of an F-OADM (Fixed Optical Add/Drop Multiplexer). The left side of FIG. 1A shows an internal structure of an optical add/drop multiplexer 1, and the right side of FIG. 1A shows a network structure using such multiple optical add/drop multiplexers 1. In the optical add/drop multiplexer 1, an N-channel multiplexed signal is amplified at an optical amplifying unit 11, and then the amplified signal is demultiplexed into individual channels at a demultiplexing unit (DMUX) 12. Subsequently, one or more of these demultiplexed channels are input to a multiplexing unit (MUX) 13 via a transponder 15 while the remaining channels are passed directly through to the multiplexing unit 13. The outputs of the demultiplexing unit 12 and the inputs of the multiplexing unit 13 are connected with patch cables. The multiplexing unit 13 multiplexes signals of N channels into one signal, which is amplified at an optical amplifying unit 14 and then output.

FIG. 1B shows a structural example of an R-OADM (Reconfigurable Optical Add/Drop Multiplexer). In the optical add/drop multiplexer 1, an N-channel multiplexed signal is amplified at the optical amplifying unit 11, and then the amplified signal is demultiplexed into individual channels at the demultiplexing unit (DMUX) 12. Subsequently, each optical switching unit 16 corresponding to a different one of the N channels passes the corresponding channel through to an input of the multiplexing unit 13, or transmits it to the transponder 15. The optical switching units 16 are remotely controlled by software, and one or more channels go through the transponder 15. The multiplexing unit 13 multiplexes signals of N channels into one signal, which is amplified at the optical amplifying unit 14 and then output.

FIG. 1C shows a structural example of WSS (Wavelength Selective switch), which is a type of R-OADM. In the optical add/drop multiplexer 1, an N-channel multiplexed signal is amplified at the optical amplifying unit 11, and the amplified signal is passed through to a wavelength selective switch 17 capable of selectively switching signal transmission with respect to each wavelength. Subsequently, the signal is amplified at the optical amplifying unit 14 and then output. Also, the N-channel multiplexed signal output from the optical amplifying unit 11 is demultiplexed into individual channels at the demultiplexing unit 12. Subsequently, one or more of the demultiplexed channels are input to the multiplexing unit 13 via the transponder 15, and then input to the wavelength selective switch 17. This structure has an advantage of being able to establish a hub structure illustrated in the right side of FIG. 1C.

Optical communications systems such as WDM and PXC have been progressively developed to achieve higher capacities. Accordingly, optical cables used in optical add/drop multiplexers have been reduced in size and increased in density, and also the handling and operation of these multiplexers have become increasingly complex.

When optical cables are connected at the start-up of an optical add/drop multiplexer and at the time of maintenance, cleaning is a necessary and important task since dirty connectors have an adverse effect on communication quality, such as a reduction in the optical level, and disrupt the communications. Thus, before connection, dirt on connectors needs to be cleaned with a connector cleaner.

However, since the core diameter of optical connectors is 10 µm, the cleaning results cannot be judged by the naked eye, and in order to check the transmission condition of the connectors, the optical level needs to be measured by actually transmitting optical signals through the connectors. Particularly for high-density multicore optical connectors, cleaning and transmission checks are difficult to conduct.

FIG. 2 shows an example of a, conventional optical level checking technique. An optical add/drop multiplexer 1X of an X station and an optical add/drop multiplexer 1Y of a Y station are connected by two optical cables 2. The optical add/drop multiplexers 1X and 1Y are each based on the R-OADM technology illustrated in FIG. 1B. As for reference numerals assigned to components of the optical add/drop multiplexers 1X and 1Y, "(W)" is attached to the reference numerals of components located on the left side (West side when north is the top of FIG. 2) of the optical cables 2 while "(E)" is attached to those of components located on the right side (East side) of the optical cables 2.

According to FIG. 2, an operator of the X station connects a full-band laser measuring device 3X to optical switches SW of an optical switching unit SW(W) of the optical add/drop multiplexer 1, and also connects an optical spectrum analyzer 4X to an output monitor port of an optical amplifier Post-Amp of an optical amplifying unit AMP(W). The operator also connects an optical power measuring device 5X to optical couplers CPL of the optical switching unit SW(W). In the same manner, an operator of the Y station connects a full-band laser measuring device 3Y to optical switches SW of an optical switching unit SW(E) of the optical add/drop multiplexer 1Y, and also connects an optical spectrum analyzer 4Y to an output monitor port of an optical amplifier Post-Amp of an optical amplifying unit AMP(E). The operator also connects an optical power measuring device 5Y to optical couplers CPL of the optical switching unit SW(E).

Subsequently, as the operators of the X and Y stations communicate with each other with mobile phones or the like, a signal is transmitted between the two stations in end-to-end checking, and optical loss is measured for each path. If the condition measured for an optical path is less than a reference set point, the path is cleaned and then a measurement is made again. Specifically, at the X station, an optical signal having a wavelength corresponding to a target optical path is generated at the full-band laser measuring device 3X, and transmitted from an optical switch SW of the optical switching unit SW(W) of the optical add/drop multiplexer 1X. The optical power of the optical signal is measured by the optical spectrum analyzer 4X at the output monitor port of the optical amplifier Post-Amp of the optical amplifying unit AMP(W), and the optical power of the optical signal is also measured by the optical power measuring device 5Y connected to an optical coupler CPL of the optical switching unit SW(E) of the Y station. Herewith, it is possible to determine whether there is dirt on a multicore cable between the optical switching unit SW(W) and the wavelength multiplexing/demultiplexing unit MUX/DMUX(W) of the optical add/drop multiplexer 1X, and whether there is dirt on a multicore cable between the wavelength multiplexing/demultiplexing unit MUX/DMUX (E) and the optical switching unit SW(E) of the optical add/drop multiplexer 1Y. In the same manner, at the Y station, an optical signal having a wavelength corresponding to a target optical path is generated at the full-band laser measuring device 3Y, and transmitted from an optical switch SW of the optical switching unit SW(E) of the optical add/drop multiplexer 1Y. The optical power of the optical signal is measured by the optical spectrum analyzer 4Y at the output monitor port of the optical amplifier Post-Amp of the optical amplifying unit AMP(E), and the optical power is also measured by the optical power measuring device 5X connected to an optical coupler CPL of the optical switching unit SW(W) of the X station. Herewith, it is possible to determine whether there is dirt on a multicore cable between the optical switching unit SW(E) and the wavelength multiplexing/demultiplexing unit MUX/DMUX(E) of the optical add/drop multiplexer 1Y, and whether there is dirt on a multicore cable between the wavelength multiplexing/demultiplexing unit MUX/DMUX(W) and the optical switching unit SW(W) of the optical add/drop multiplexer 1X.

Japanese Laid-open Patent Application Publication No. 2005-26899

Japanese Laid-open Patent Application Publication No. 2002-223197

According to the conventional technique as described above, with respect to each wavelength, a corresponding optical signal is added while the operators on both ends are communicating with each other, and then the optical power of the added optical signal is measured end-to-end and is also measured, by the optical spectrum analyzer 4X/4Y, in the middle of the transmission path where the optical signal is multiplexed with other optical signals. Accordingly, the following problems are observed with the conventional technique.

(1) The measurements need to be made end-to-end between two individual devices (multiplexers) and thus cannot be made in a single closed device, whereby the checking process is burdensome.

(2) Since an optical signal having a predetermined wavelength is actually generated for the checking process, the measurements cannot be made for optical signals having wavelengths being used. Accordingly, the measurements can be carried out only at the initial start-up of the multiplexers, or the operation of the device needs to be stopped in order to conduct the measurements.

(3) It is sometimes the case that the transmission within a multiplexer is degraded with age or after replacement of a broken package having been in operation. In such a case, cleaning optical connectors is the only effective way to restore the transmission condition.

(4) In the case of a multiplexer using multicore optical connectors, even though only one core needs to be cleaned, the operation of other lines has to be stopped for the cleaning due to the configuration of the multicore optical connector, which results in imposing a considerable burden on the operators.

On the other hand, Patent Document 1 discloses an optical relay device capable of specifically determining a failure or a fault part within the device. Patent Document 2 discloses an optical network system capable of readily securing the quality of transmission according to the digital signal level.

However, the technologies of Patent Documents 1 and 2 monitor a failure or the transmission quality by the relationship with another device, and therefore, the measurements cannot be made in a single closed system. Thus, the above-mentioned problems cannot be solved by these disclosed technologies.

SUMMARY

According to an aspect of the present disclosures, an optical add/drop multiplexing device demultiplexes a first multiplexed optical signal input via a first optical cable into multiple optical signals according to wavelengths, drops one or more of the demultiplexed optical signals to a transponder, adds one or more optical signals output from the transponder to the demultiplexed optical signals, multiplexes the demultiplexed optical signals into a second multiplexed optical signal, and outputs the second multiplexed optical signal to a second optical cable. The optical add/drop multiplexing device includes an injecting unit configured to inject one of measurement optical signals, each of whose wavelengths corresponds to a wavelength of a different one of the demultiplexed optical signals, into a core of a multicore cable within the optical add/drop multiplexing device, the core being used to transmit one of the demultiplexed optical signals which has the same wavelength as the one of the measurement optical signals; a preventing unit configured to prevent the one of the measurement optical signals from emanating toward the second optical cable; a measuring unit configured to measure optical levels of the one of the measurement optical signals at positions before and after the corresponding core of the multiple cable; a calculating unit configured to calculate, for the wavelength of the one of the measurement optical signals, optical loss of the corresponding core of the multicore cable, based on the measured optical levels; and an informing unit configured to report the calculated optical loss.

Additional objects and advantages of the embodiment will be set forth in part in the description which follows, and in part will be obvious from the description, or may be learned by practice of the present disclosures. The object and advantages of the present disclosures will be realized and attained by means of the elements and combinations particularly pointed out in the appended claims.

It is to be understood that both the foregoing general description and the following detailed description are exemplary and explanatory only and are not restrictive of the present disclosures, as claimed.

BRIEF DESCRIPTION OF DRAWINGS

FIG. 6 shows a principle of output level control performed by a narrow-band variable-output photoelectric conversion unit of a transponder;

FIGS. 9A and 9B show an example of the operation of measuring the transmission conditions in a drop direction on the East side;

DESCRIPTION OF EMBODIMENT

Embodiments that describe the best mode for carrying out the present disclosures are explained next.

(a) First Embodiment

Figure 2:
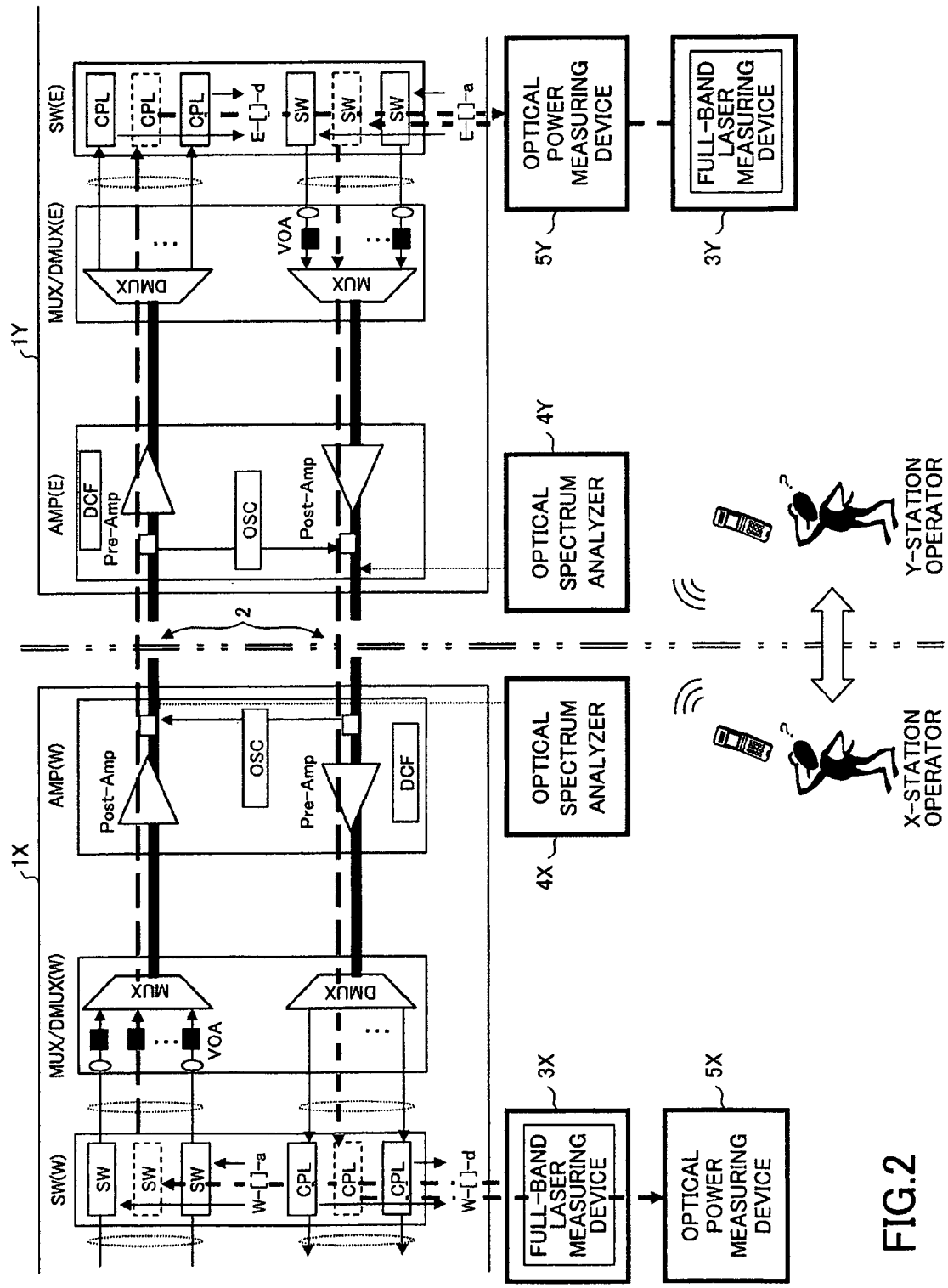
FIG. 2 shows an example of a conventional optical level checking technique.
Figure 3:
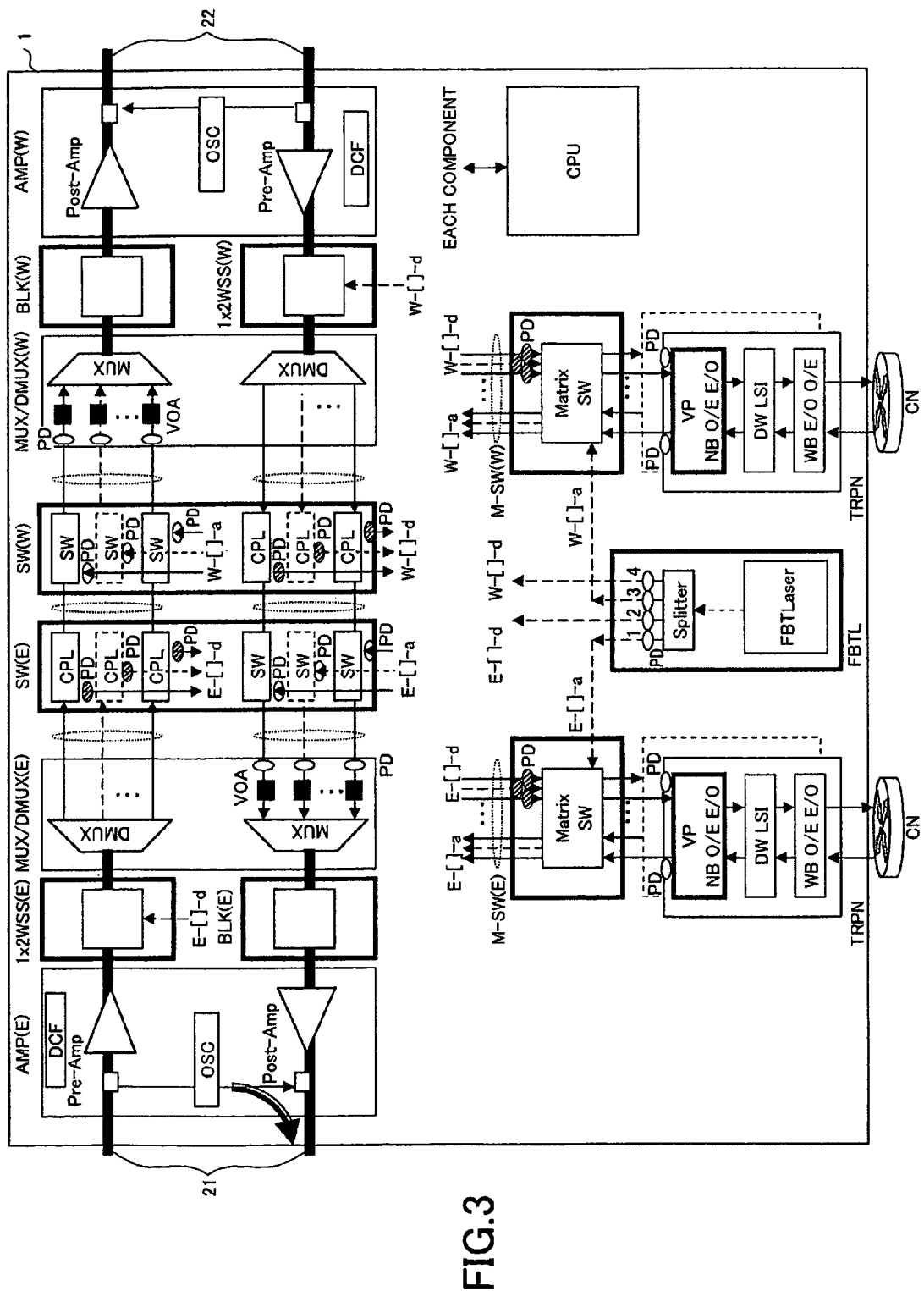
FIG. 3 shows a structural example of an optical add/drop multiplexer according to a first embodiment of the present disclosures.

FIG. 3 shows a structural example of an optical add/drop multiplexer according to the first embodiment of the present disclosures. The optical add/drop multiplexer is based on the R-OADM illustrated in FIG. 1B. While FIG. 2 shows the optical add/drop multiplexers 1X and 1Y opposing each other across the optical cables 2, FIG. 3 shows the structure of a single optical add/drop multiplexer 1 in which the left and right side structures of FIG. 2 are swapped and integrated into one structure.

According to FIG. 3, the optical add/drop multiplexer 1 includes an optical amplifying unit AMP(E) which is connected to West-side optical cables 21 and includes optical amplifiers Pre-Amp and Post-Amp; a wavelength selective switching unit 1×2WSS(E) connected to the optical amplifier Pre-Amp of the optical amplifying unit AMP(E); and a wavelength blocker unit BLK(E) connected to the optical amplifier Post-AMP of the optical amplifying unit AMP(E). The optical amplifying unit AMP(E) includes a dispersion compensating unit DCF and a wavelength supervisory control process unit OSC which transmits a control signal to the optical cable 21 to thereby control the optical level of a corresponding optical signal of an opposing optical add/drop multiplexer 1 which is connected to the other end of the optical cable 21. The wavelength selective switching unit 1×2WSS(E) is a component newly added to the structure of FIG. 2, and is used to inject an optical signal for measuring the transmission conditions in the drop direction on the East side. The wavelength blocker unit BLK(E) is also a newly added component, and is configured to prevent, from emanating toward the optical cable 21, an optical signal injected for measuring the transmission conditions in the add direction on the East side.

The optical add/drop multiplexer 1 also includes a wave multiplexing/demultiplexing unit MUX/DMUX(E) which includes a demultiplexing unit DMUX connected to the wavelength selective switching unit 1×2WSS(E) and a multiplexing unit MUX connected to the wavelength blocker unit BLK(E); and an optical switching unit SW(E) including multiple optical couplers CPL connected to the demultiplexing unit DMUX of the wavelength multiplexing/demultiplexing unit MUX/DMUX(E) via multicore cables and multiple optical switches SW connected to the multiplexing unit MUX of the wavelength multiplexing/demultiplexing unit MUX/DMUX(E). In the optical switching unit SW(E), photodiodes PD used for optical level measurements are provided at output ports of the optical couplers CPL as well as at input ports of the optical switches SW. In the wavelength multiplexing/demultiplexing unit MUX/DMUX(E), variable optical attenuators VOA and photodiodes PD are provided on the input side of the multiplexing unit MUX.

The optical add/drop multiplexer 1 further includes an optical switching unit SW(W) which includes multiple optical switches SW connected to the optical couplers CPL of the optical switching unit SW(E) via multicore cables and multiple optical couplers CPL connected to the optical switches SW of the optical switching unit SW(E) via multicore cables; and a wavelength multiplexing/demultiplexing unit MUX/DMUX(W) which includes a multiplexing unit MUX connected to the optical switches SW of the optical switching unit SW(W) via multicore cables and a demultiplexing unit DMUX connected to the optical couplers CPL of the optical switching unit SW(W) via multicore cables. In the optical switching unit SW(W), photodiodes PD for optical level measurements are provided at input ports of the optical switches SW and at output ports of the optical couplers CPL. In the wavelength multiplexing/demultiplexing unit MUX/DMUX (W), variable optical attenuators VOA and photodiodes PD are provided on the input side of the multiplexing unit MUX.

The optical add/drop multiplexer 1 further includes a wavelength blocker unit BLK(W) connected to the multiplexing unit MUX of the wavelength multiplexing/demultiplexing unit MUX/DMUX(W); a wavelength selective switching unit 1×2WSS(W) connected to the demultiplexing unit DMUX of the wavelength multiplexing/demultiplexing unit MUX/DMUX(W); and an optical amplifying unit AMP(W) which includes an optical amplifier Post-Amp connected to the wavelength blocker unit BLK(W) and an optical amplifier Pre-Amp connected to the wavelength selective switching unit 1×2WSS(W). The wavelength blocker unit BLK(W) is a component newly added to the structure of FIG. 2, and is configured to prevent, from emanating toward the optical cable 22, an optical signal injected for measuring the transmission condition in the add direction on the West side. The wavelength selective switching unit 1×2WSS(W) is also a component newly added to the structure of FIG. 2, and is used to inject an optical signal for measuring the transmission conditions in the drop direction on the West side. The optical amplifying unit AMP(W) includes a dispersion compensating unit DCF and a wavelength supervisory control process unit OSC which transmits a control signal to the optical cable 22 to thereby control the optical level of a corresponding optical signal of an opposing optical add/drop multiplexer 1 connected to the other end of the optical cable 22.

The optical add/drop multiplexer 1 further includes a matrix switching unit M-SW(E) which includes a matrix switch Matrix SW connected between multiple transponders TRPN and the input ports of the optical switches SW and the output ports of the optical couplers CPL of the optical switching unit SW(E). In the matrix switch Matrix SW, photodiodes PD are provided at an input part connected to the optical couplers CPL of the optical switching unit SW(E). The optical switching unit SW(E) and the matrix switching unit M-SW(E) are connected to each other via multicore cables. Each transponder TRPN includes a narrow-band variable-output photoelectric conversion unit VP NB O/E E/O; a digital wrapper unit DW LSI; and a wideband photoelectric conversion unit WB O/E E/O connected to a client node CN.

The optical add/drop multiplexer 1 further includes a matrix switching unit M-SW(W) which includes a matrix switch Matrix SW connected between multiple transponders TRPN and the input ports of the optical switches SW and the output ports of the optical couplers CPL of the optical switching unit SW(W). In the matrix switch Matrix SW, photodiodes PD are provided at an input part connected to the optical couplers CPL of the optical switching unit SW(W). The optical switching unit SW(W) and the matrix switching unit M-SW(W) are connected to each other via multicore cables. Each transponder TRPN includes a narrow-band variable-output photoelectric conversion unit VP NB O/E E/O; a digital wrapper unit DW LSI; and a wideband photoelectric conversion unit WB O/E E/O connected to a client node CN.

The optical add/drop multiplexer 1 further includes a full band tunable laser unit FBTL which includes a full band tunable laser FBTLaser for generating an optical signal having an arbitrary wavelength; and a splitter Splitter for splitting an output light of the full band tunable laser FBTLaser into a predetermined number of beams ("4" in the example of FIG. 3, corresponding to the add directions and the drop directions on the West and East sides). Photodiodes PD are provided at output ports #1 through #4 of the splitter. The output port #1 is connected to the matrix switch Matrix SW of the matrix switching unit M-SW(E); the output port #2 is connected to the wavelength selective switching unit 1×2WSS(E); the output port #3 is connected to the matrix switch Matrix SW of the matrix switching unit M-SW(W); and the output port #4 is connected to the wavelength selective switching unit 1×2WSS(W).

The optical add/drop multiplexer 1 further includes a processor CPU configured to control components (including the photodiodes PD) or input and output signals to each component.

Figure 4A:
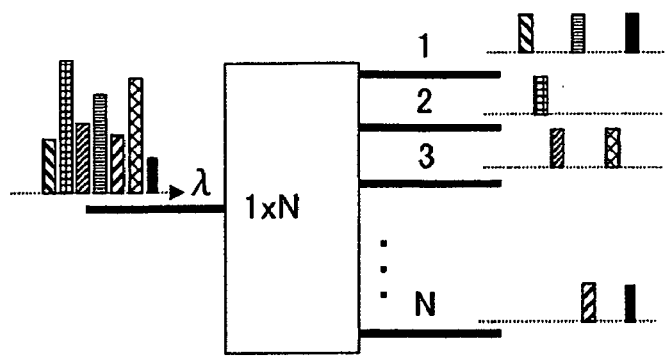
FIGS. 4A through 4D show a principle of a wavelength selective switch.

FIGS. 4A through 4D show a principle of a wavelength selective switch used in the wavelength selective switching units 1×2WSS (E) and 1×2WSS(W). FIG. 4A shows schematic operations of a 1×N wavelength selective switch. When a multiplexed optical signal, into which multiple channels of wavelengths (A) having different power levels are multiplexed, is input from the left side, the wavelength selective switch selects one or more arbitrary wavelengths and adjusts the power levels of optical signals having the selected wavelengths in accordance with external control, and then multiplexes the resultant optical signals into one optical signal and outputs the multiplexed optical signal from an arbitrary port on the right side. The wavelength selective switch is able to also perform the operation in the reverse direction. That is, when a multiplexed optical signal is input to a port on the right side, the wavelength selective switch selects one or more arbitrary wavelengths and adjusts the power levels of optical signals having the selected wavelengths, and then multiplexes the resultant optical signals into one optical signal and outputs the multiplexed optical signal from a port on the left side. In the wavelength selective switching units 1×2WSS(E) and 1×2WSS(W) of FIG. 3, the wavelength selective switch is used for multiplexing signals in two directions into a signal in a single direction.

Figure 4B:
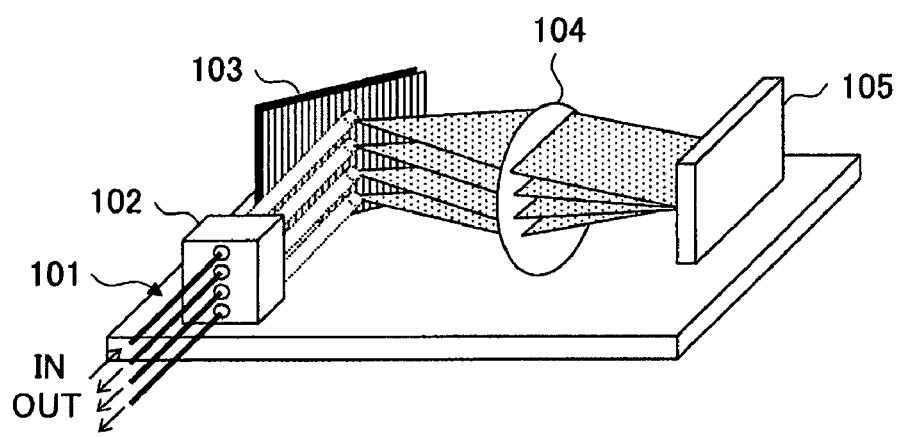

FIG. 4B shows an example of the mechanical structure of the wavelength selective switch. An optical signal input from one optical cable 101 is converted by a collimator 102 into parallel rays of light, which are incident on a diffraction grating 103. The parallel rays of light are diffracted by the diffraction grating 103 according to the wavelength spectrum of the incident light, and then collected by a lens 104. The collected light is reflected by a mirror 105 driven by a MEMS (Micro Electro Mechanical System), and output to one of the optical cables 101 via the lens 104, the diffraction grating 103 and the collimator 102.

Figure 4C:
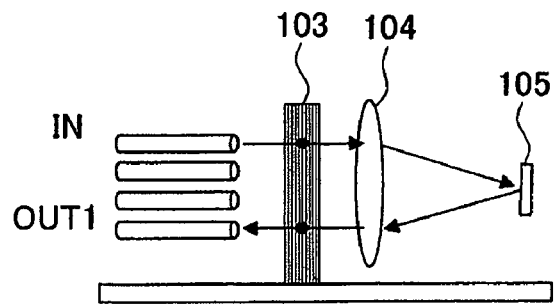
Figure 4D:
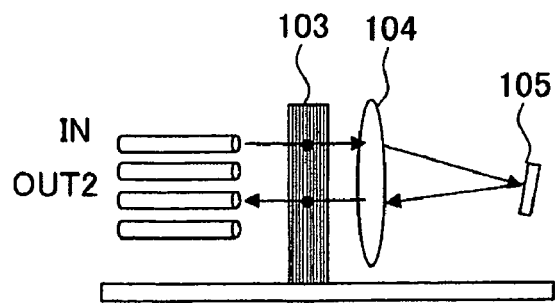

FIGS. 4C and 4D are front views of FIG. 4B. Due to the difference in the angle of the mirror 105, in FIG. 4C, the optical signal input from IN is output from OUT1; in FIG. 4D, the optical signal input from IN is output from OUT2. Note that the power level is also adjusted by the angle of the mirror 105.

Figure 5A:
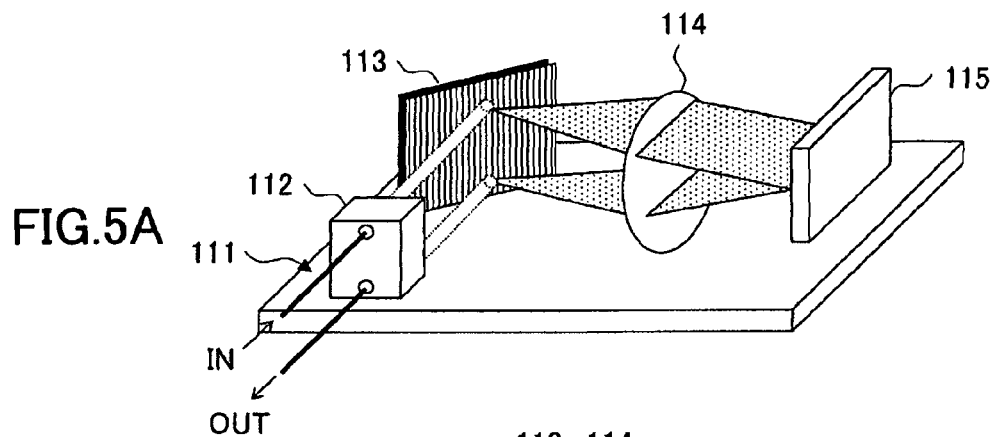
FIGS. 5A through 5D show a principle of a wavelength blocker.

FIGS. 5A through 5D show a principle of a wavelength blocker used in the wavelength blocker units BLK(E) and BLK(W). FIG. 5A shows an example of the mechanical structure of the wavelength blocker. The wavelength blocker has a similar structure as that of the wavelength selective switch illustrated in FIG. 4B, and can be considered as a 1×1 wavelength selective switch.

In FIG. 5A, an optical signal input from an optical cable 111 is converted by a collimator 112 into parallel rays of light, which are incident on a diffraction grating 113. The parallel rays of light are diffracted by the diffraction grating 113 according to the wavelength spectrum of the incident light, and then collected by a lens 114. The collected light is reflected by a mirror 115 driven by a MEMS, and output to another optical cable 111 via the lens 114, the diffraction grating 113 and the collimator 112.

Figure 5B:
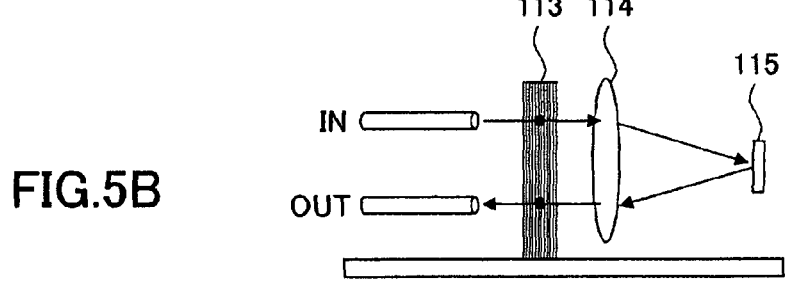
Figure 5C:
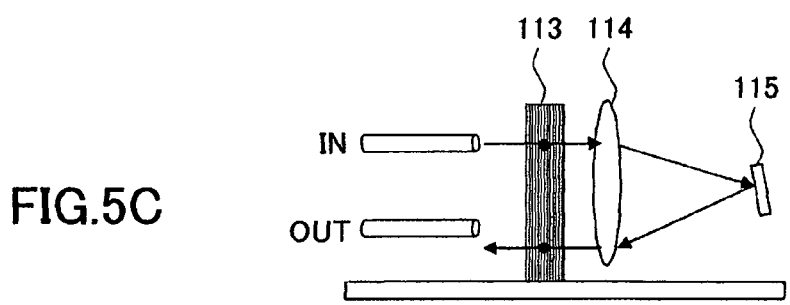

FIGS. 5B and 5C are front views of FIG. 5A. Due to the difference in the angle of the mirror 115, in FIG. 5B, the optical signal input from IN is output from OUT; in FIG. 5C, the optical signal input from IN is blocked, and therefore, is not output from OUT. Note that the angle of the mirror 115 not only regulates the switching (on/off) but also adjusts the attenuation.

Figure 5D:
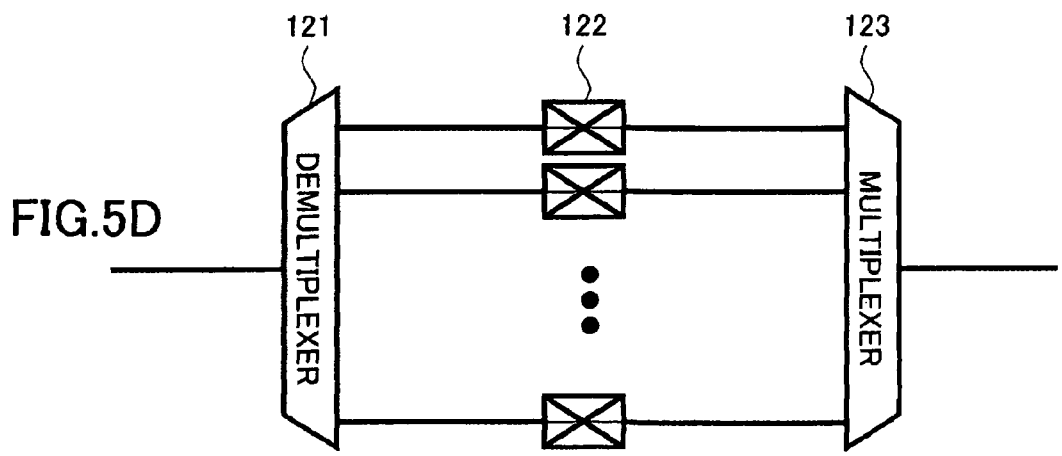

FIG. 5D shows functional blocks of the wavelength blocker, which includes a demultiplexer 121, multiple attenuators 122 and a multiplexer 123.

FIG. 6 shows a principle of output level control performed by the narrow-band variable-output photoelectric conversion unit VP NB O/E E/O of the transponder TRPN. FIG. 6 shows a relationship between a laser drive current (horizontal axis) and optical output (vertical axis) in an E/O (electrical/optical) conversion. The level of optical output can be changed by changing the bias level and the modulation amplitude level.

Figure 7A:
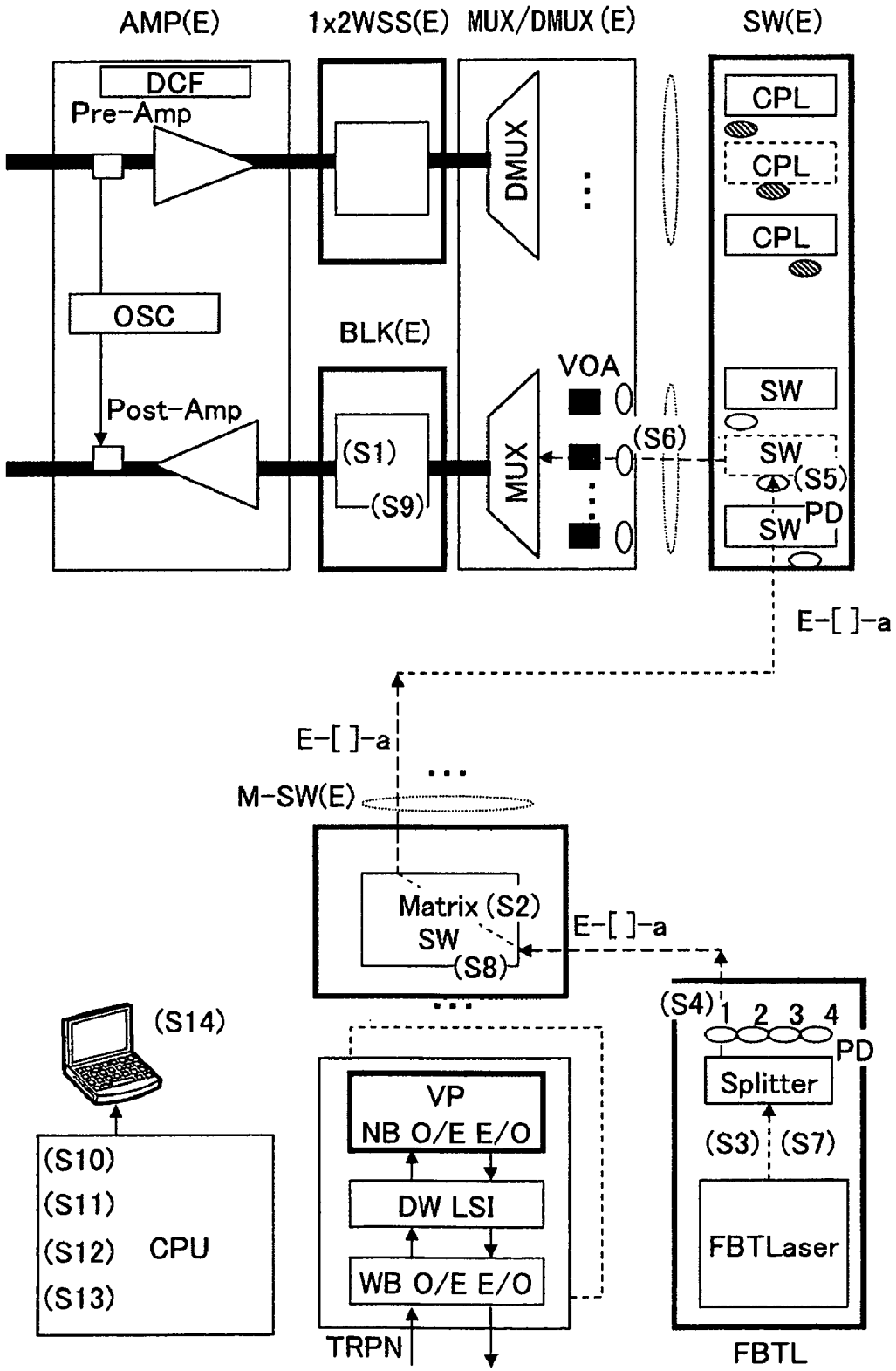
FIGS. 7A and 7B show an example of an operation of measuring transmission conditions in an add direction on the East side.
Figure 7B:
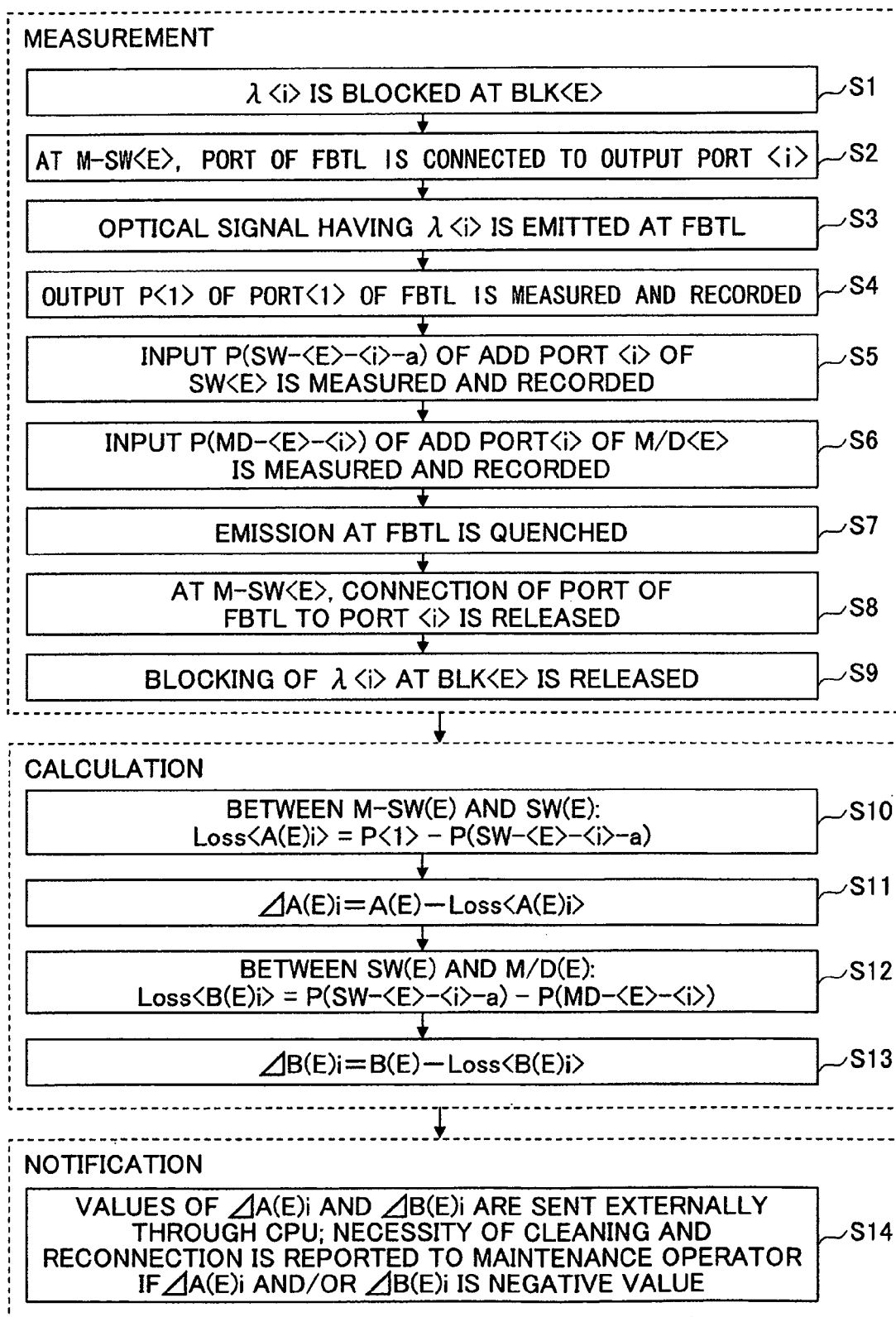

FIGS. 7A and 7B show an example of the operation of measuring the transmission conditions in the add direction on the East side. FIG. 7A shows a signal flow within a part related to the operation, and FIG. 7B is a flowchart of the operation. Note that each of Steps S1 through S14 in FIG. 7B is performed at a component in FIG. 7A, to which the same step number is attached.

This example assumes that at the start-up of the optical add/drop multiplexer 1, the wavelengths of a multiplexed optical signal are continuous with no wavelength gaps in any path. For example, if there are forty wavelength, the transmission measurements are carried out in the order of λ=1, 2, 3, . . . , i, . . . , 39 and 40. FIGS. 7A and 7B show a case of performing the measurements of an optical path having an i-th wavelength (λ=i). The following are symbols used in FIGS. 7A and 7B.

λ<i>: i-th wavelength
P<1>: optical power at the port #1 of the full band tunable laser unit FBTL P(SW-<E>-<i>-a): optical power of the i-th wavelength optical signal in the add direction at the input of the optical switching unit SW(E)

P(MD-<E>-<i>): optical power of the i-th wavelength optical signal in the add direction at the input of the wavelength multiplexing/demultiplexing unit MUX/DMUX(E)

A(E): allowable loss between the matrix switching unit M-SW(E) and the optical switching unit SW(E)

Loss<A(E)i>: actual loss of the i-th wavelength optical signal between the matrix switching unit M-SW(E) and the optical switching unit SW(E)

ΔA(E)i: difference between the actual loss of the i-th wavelength optical signal and the allowable loss between the matrix switching unit M-SW(E) and the optical switching unit SW(E)

B(E): allowable loss between the optical switching unit SW(E) and the wavelength multiplexing/demultiplexing unit MUX/DMUX(E)

Loss<B(E)i>: actual loss of the i-th wavelength optical signal between the optical switching unit SW(E) and the wavelength multiplexing/demultiplexing unit MUX/DMUX(E)

ΔB(E)i: difference between the actual loss of the i-th wavelength optical signal and the allowable loss between the optical switching unit SW(E) and the wavelength multiplexing/demultiplexing unit MUX/DMUX(E)

According to FIGS. 7A and 7B, first, the i-th wavelength is blocked at the wavelength blocker unit BLK(E) (Step S1).

Next, at the matrix switching unit M-SW(E), the port #1 of the full band tunable laser unit FBTL is connected to a port <i> (Step S2).

An i-th wavelength optical signal is emitted at the full band tunable laser unit FBTL (Step S3).

An output P<1> of the port #1 of the full band tunable laser unit FBTL is measured and recorded (Step S4).

An input P(SW-<E>-<i>-a) of an add port <i> of the optical switching unit SW(E) is measured and recorded (Step S5).

An input P(MD-<E>-<i>) of an add port <i> of the wavelength multiplexing/demultiplexing unit MUX/DMUX(E) is measured and recorded (Step S6).

The emission of the i-th wavelength optical signal at the full band tunable laser unit FBTL is quenched (Step S7).

At the matrix switching unit M-SW(E), the connection of the port <i> with the port #1 of the full band tunable laser unit FBTL is released (Step S8).

The blocking of the i-th wavelength at the wavelength blocker unit BLK(E) is released (Step S9).

An actual loss of the i-th wavelength optical signal between the matrix switching unit M-SW(E) and the optical switching unit SW(E) is calculated: Loss<A(E)i>=P<1>−P(SW-<E>-<i>-a) (Step S10).

A difference between the actual loss of the i-th wavelength optical signal and the allowable loss A(E) between the matrix switching unit M-SW(E) and the optical switching unit SW(E) is calculated: ΔA(E)i=A(E)−Loss<A(E)i> (Step S11).

An actual loss of the i-th wavelength optical signal between the optical switching unit SW(E) and the wavelength multiplexing/demultiplexing unit MUX/DMUX(E) is calculated: Loss<B(E)i>=P(SW-<E>-<i>-a)−P(MD-<E>-<i>) (Step S12).

A difference between the actual loss of the i-th wavelength optical signal and the allowable loss between the optical switching unit SW(E) and the wavelength multiplexing/demultiplexing unit MUX/DMUX(E) is calculated: ΔB(E)i=B(E)−Loss<B(E)i> (Step S13).

Then, the values of ΔA(E)i and ΔB(E)i are sent externally through the processor CPU, and in the case where ΔA(E)i and/or ΔB(E)i is a negative value, the necessity of cleaning and reconnection of an optical path for which the negative value has been obtained is reported to a maintenance operator (Step S14).

Figure 8A:
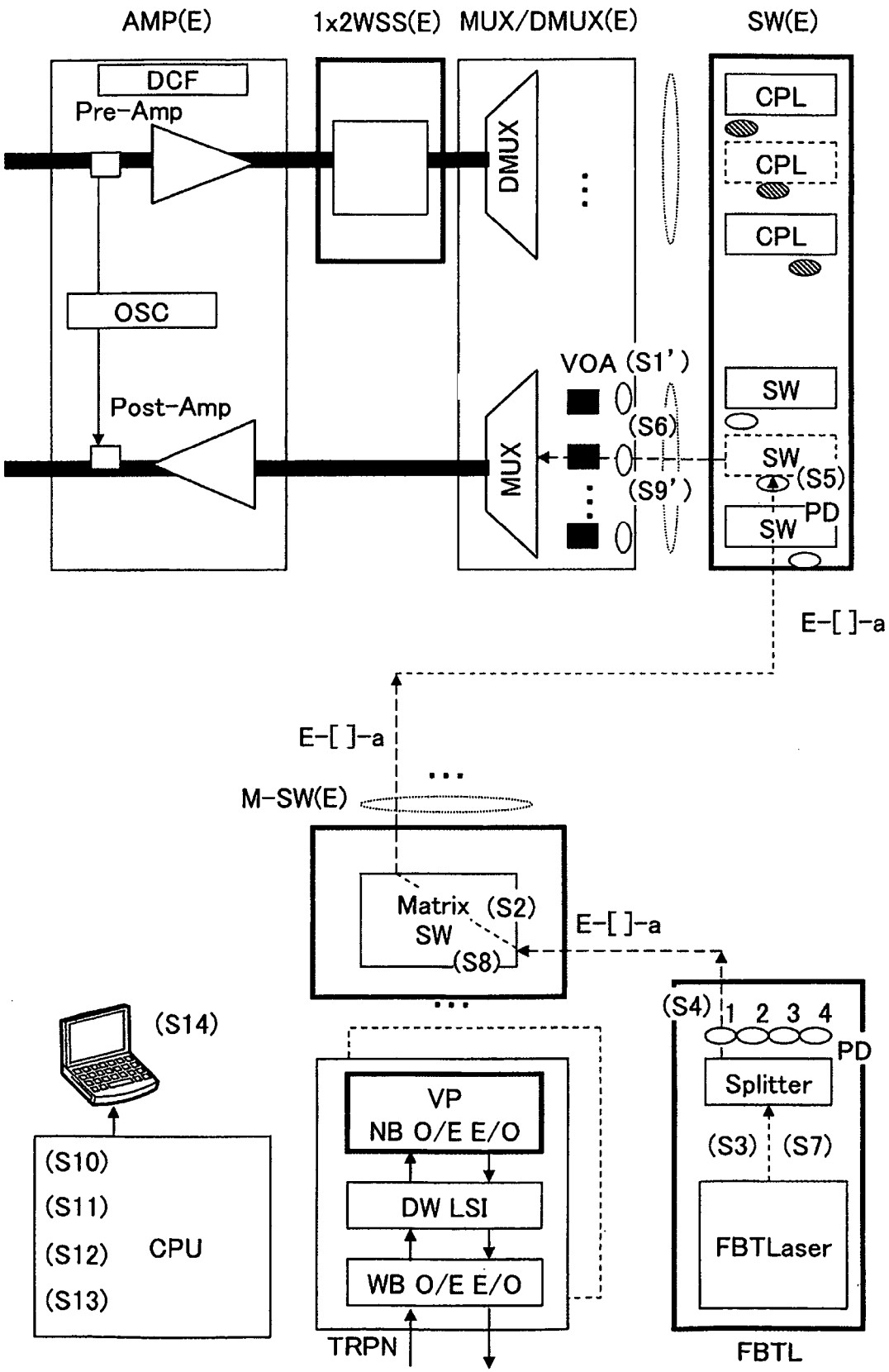
FIGS. 8A and 8B show another example of the operation of measuring the transmission conditions in the add direction on the East side.
Figure 8B:
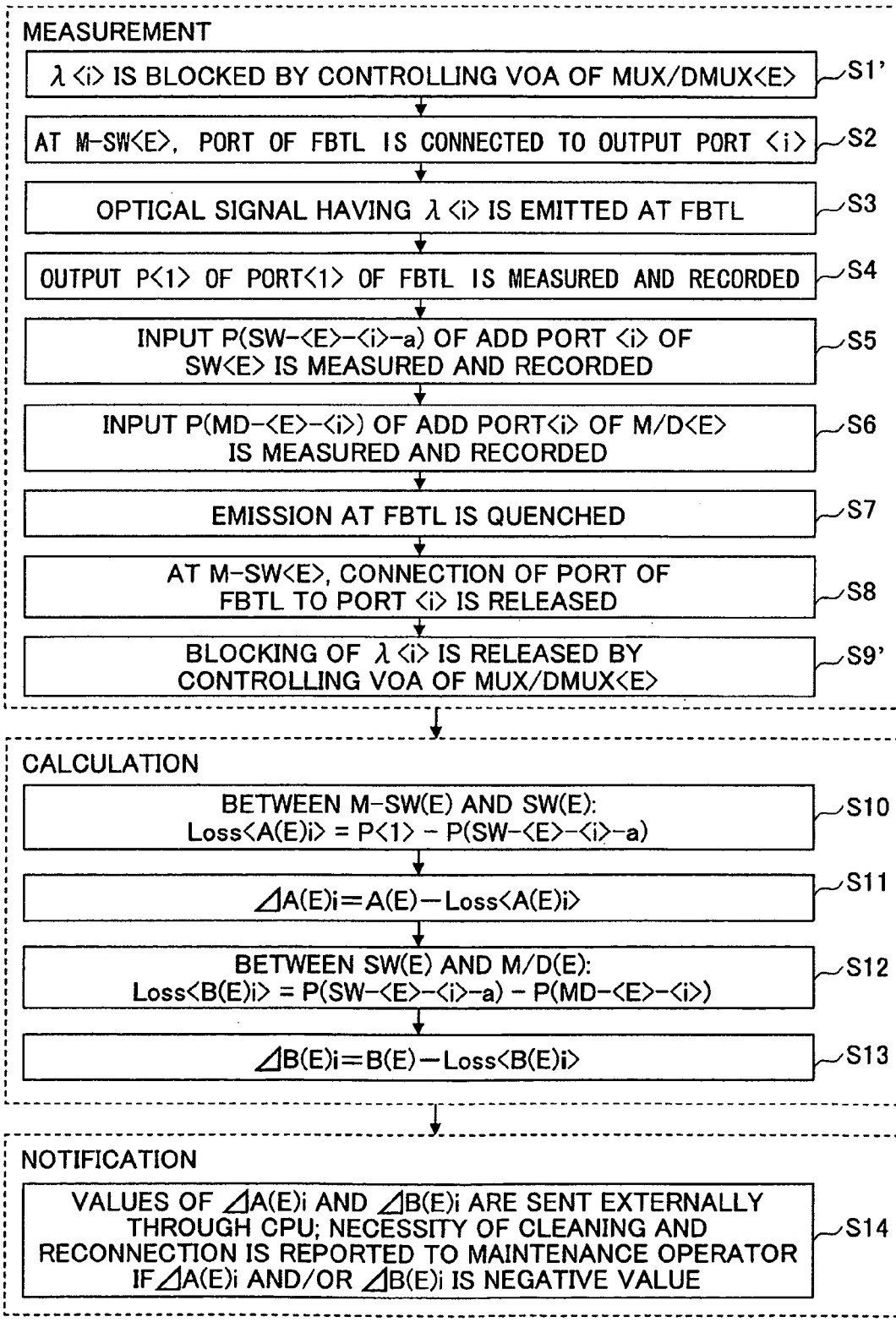

FIGS. 8A and 8B show another example of the operation of measuring the transmission condition in the add direction on the East side. By not using the wavelength blocker unit BLK(E) but controlling a variable optical attenuator VOA in the wavelength multiplexing/demultiplexing unit MUX/DMUX(E), the same measurements as those in FIGS. 7A and 7B can be made. That is, instead of preventing a measurement-target wavelength (the i-th wavelength in this case) at the wavelength blocker unit BLK(E) from emanating into the WDM transmission path, the amount of attenuation is controlled by a variable optical attenuator VOA, thereby achieving a similar function.

The operation of FIGS. 8A and 8B is different from that of FIGS. 7A and 7B in that the blocking of the i-th wavelength and the release of the blocking are made not by the wavelength blocker unit BLK(E), but by controlling a variable optical attenuator VOA of the wavelength multiplexing/demultiplexing unit MUX/DMUX(E) in Steps S1' and S9'.

Figure 9A:
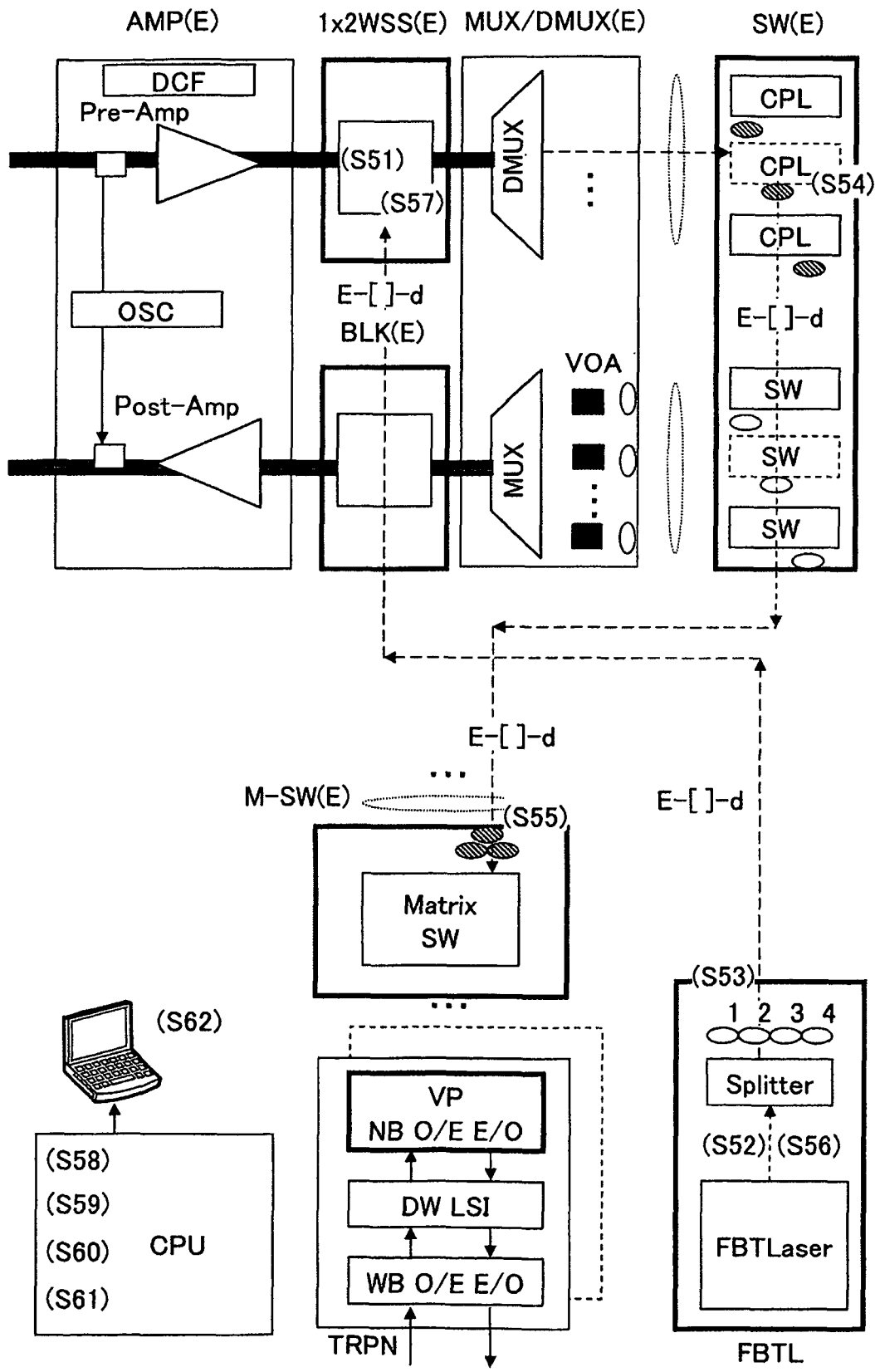

FIGS. 9A and 9B show an example of the operation of measuring the transmission conditions in the drop direction on the East side.

This example assumes that at the start-up of the optical add/drop multiplexer 1, the wavelengths of a multiplexed optical signal are continuous with no wavelength gaps in any path. For example, if there are forty wavelengths, the transmission measurements are carried out in the order of λ=1, 2, 3, . . . , i, . . . , 39 and 40. FIGS. 9A and 9B show a case of performing the measurements of the i-th wavelength optical signal. The following are symbols used in FIGS. 9A and 9B.

λ<i>: i-th wavelength

P<2>: optical power at the port #2 of the full band tunable laser unit FBTL

P(SW-<E>-<i>-d) optical power of the i-th wavelength optical signal in the drop direction at the input of the optical switching unit SW(E)

P(MS-<E>-<i>): optical power of the i-th wavelength optical signal in the drop direction at the input of the matrix switching unit M-SW(E)

C(E): allowable loss between the wavelength multiplexing/demultiplexing unit MUX/DMUX(E) and the optical switching unit SW(E)

Loss<C(E)i>: actual loss of the i-th wavelength optical signal between the wavelength multiplexing/demultiplexing unit MUX/DMUX(E) and the optical switching unit SW(E)

ΔC(E)i: difference between the actual loss of the i-th wavelength optical signal and the allowable loss between the wavelength multiplexing/demultiplexing unit MUX/DMUX(E) and the optical switching unit SW(E)

D(E): allowable loss between the optical switching unit SW(E) and the matrix switching unit M-SW(E)

Loss<D(E)i>: actual loss of the i-th wavelength optical signal between the optical switching unit SW(E) and the matrix switching unit M-SW(E)

ΔD(E)i: difference between the actual loss of the i-th wavelength optical signal and the allowable loss between the optical switching unit SW(E) and the matrix switching unit M-SW(E)

According to FIGS. 9A and 9B, first, at the wavelength selective switching unit 1×2WSS(E), an i-th wavelength optical signal output from the port #2 of the full band tunable laser unit FBTL is multiplexed in the direction toward the wavelength multiplexing/demultiplexing unit MUX/DMUX(E) (Step S51).

Next, an i-th wavelength optical signal is emitted at the full band tunable laser unit FBTL (Step S52).

An output P<2> of the port #2 of the full band tunable laser unit FBTL is measured and recorded (Step S53).

An output P(SW-<E>-<i>-d) of a drop port <i> of the optical switching unit SW(E) is measured and recorded (Step S54).

An input P(MS-<E>-<i>) of a drop port <i> of the matrix switching unit M-SW(E) is measured and recorded (Step S55).

The emission of the i-th wavelength optical signal at the full band tunable laser unit FBTL is quenched (Step S56).

The multiplexing of the i-th wavelength optical signal at the wavelength selective switching unit 1×2WSS(E) is stopped (Step S57).

An actual loss of the i-th wavelength optical signal between the wavelength multiplexing/demultiplexing unit MUX/DMUX(E) and the optical switching unit SW(E) is calculated: Loss<C(E)i>=P<2>−P(SW-<E>-<i>-d) (Step S58).

A difference between the actual loss of the i-th wavelength optical signal and the allowable loss C(E) between the wavelength multiplexing/demultiplexing unit MUX/DMUX(E) and the optical switching unit SW(E) is calculated: $\Delta C(E)i=C(E)-Loss<C(E)i>$ (Step S59).

An actual loss of the i-th wavelength optical signal between the optical switching unit SW(E) and the matrix switching unit M-SW(E) is calculated: Loss<D(E)i>=P(SW-<E>-<i>-d)−P(MS-<E>-<i>) (Step S60).

A difference between the actual loss of the i-th wavelength optical signal and the allowable loss D(E) between the optical switching unit SW(E) and the matrix switching unit M-SW(E) is calculated: $\Delta D(E)i=D(E)-Loss<D(E)i>$ (Step S61).

Then, the values of $\Delta C(E)i$ and $\Delta D(E)i$ are sent externally through the processor CPU, and in the case where $\Delta C(E)i$ and/or $\Delta D(E)i$ is a negative value, the necessity of cleaning and reconnection of an optical path for which the negative value has been obtained is reported to a maintenance operator (Step S62).

Figure 10A:
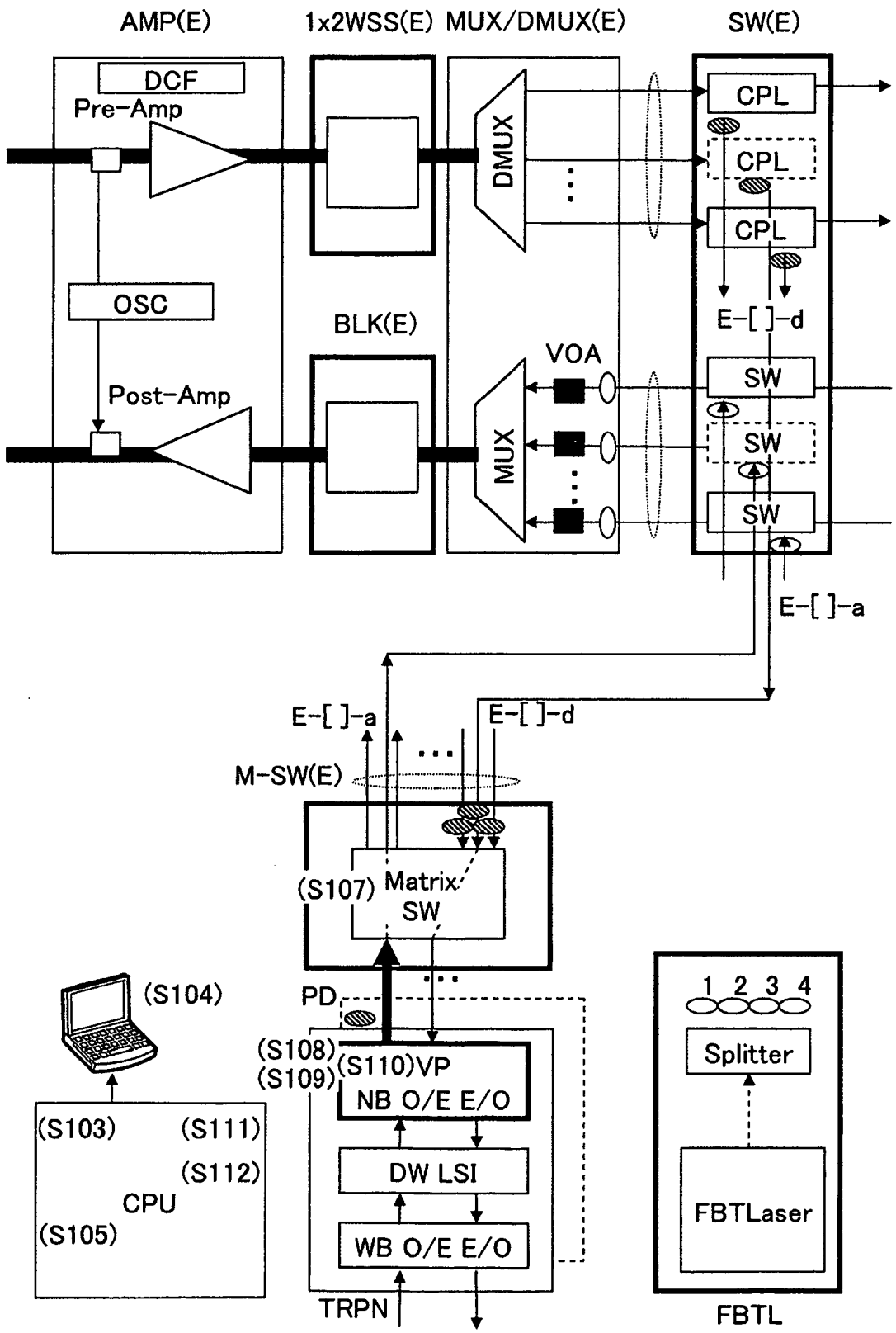
FIGS. 10A and 10B show an example of the operation of measuring the transmission conditions in the add direction on the East side and adjusting an output of a transponder in the optical add/drop multiplexer.
Figure 10B:
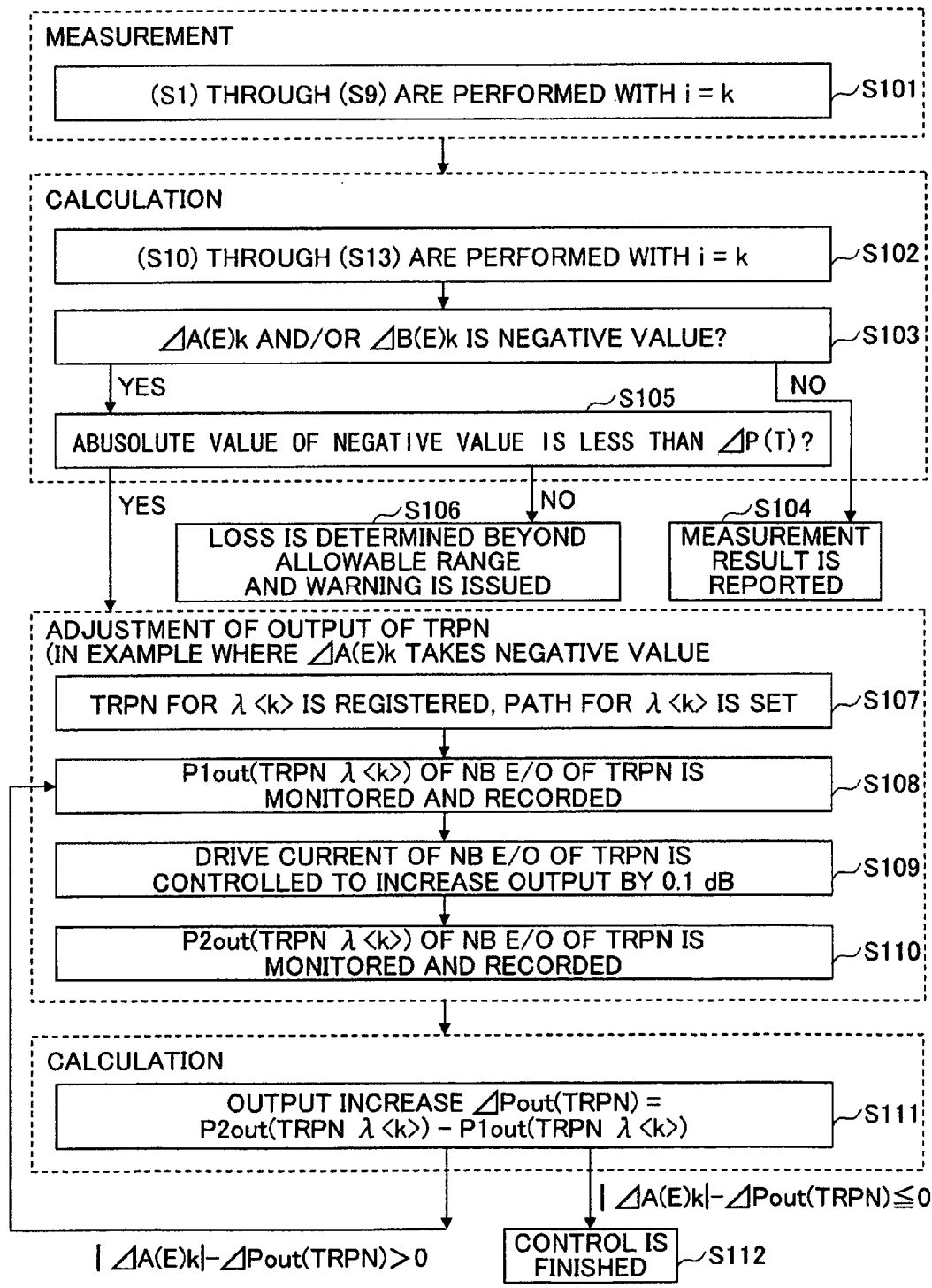

FIGS. 10A and 10B show an example of the operation of measuring the transmission condition in the add direction on the East side and adjusting an output of a corresponding transponder in the optical add/drop multiplexer 1. FIG. 10A shows a signal flow within a part related to the operation, and FIG. 10B is a flowchart of the operation.

In this example, the measurements are carried out for an arbitrary wavelength k while the optical add/drop multiplexer 1 is in operation, and the drive current of the narrow-band variable-output photoelectric conversion unit VP NB O/E E/O, which controls the optical output of a corresponding transponder TRPN, is controlled based on the measurement result. As a result of the measurements, if there is an optical loss, the optical output of the transponder TRPN is increased by the sum of a target optical-level difference ($\Delta A(E)k$, for example) and 0.1 dB using loop control, whereby the optical loss in the optical add/drop multiplexer 1 is compensated for. Note however that, in the case where the absolute value of $\Delta A(E)k$, and/or $\Delta B(E)k$, exceeds the breadth of the optical output levels (upper and lower optical output levels) of the transponder TRPN, $\Delta P(T)$, the optical loss cannot be compensated for by controlling the transponder TRPN. In such a case, a warning is issued to inform the operator.

According to FIGS. 10A and 10B, first, Steps S1 through S9 of FIGS. 7A and 7B (alternatively, Steps S1' through S9' of FIGS. 8A and 8B) are performed with i=k (Step S101).

Next, Steps S10 through S13 of FIGS. 7A and 7B are performed with i=k (Step S102).

Then, it is determined whether $\Delta A(E)k$ and/or $\Delta B(E)k$ is a negative value (Step S103). If $\Delta A(E)k$ and/or $\Delta B(E)k$ is not a negative value (Step S103: NO), the measurement result is reported to the operator (Step S104).

If $\Delta A(E)k$ and/or $\Delta B(E)k$ is a negative value (Step S103: YES), it is further determined whether the absolute value of the negative value is less than the output tolerance $\Delta P(T)$ of the transponder TRPN (Step S105). If the absolute value is not less than the output tolerance $\Delta P(T)$ (Step S105: NO), the optical loss is beyond the allowable range and a warning is issued to inform the operator (Step S106).

Assume here that $\Delta A(E)k$ is a negative value. In the case where the absolute value of $\Delta A(E)k$ is less than the output tolerance $\Delta P(T)$ (Step S105: YES), the transponder TRPN for the k-th wavelength is registered, and an optical path for the k-th wavelength within the optical add/drop multiplexer 1 is set (Step S107).

An output P1out(TRPN λ<k>) of the narrow-band variable-output photoelectric conversion unit VP NB O/E E/O of the transponder TRPN is monitored and recorded (Step S108).

The drive current of the narrow-band variable-output photoelectric conversion unit VP NB O/E E/O of the transponder TRPN is controlled to increase the output power by 0.1 dB (Step S109).

An output P2out (TRPN λ<k>) of the narrow-band variable-output photoelectric conversion unit VP NB O/E E/O of the transponder TRPN is monitored and recorded (Step S110).

An increase in the output is calculated: $\Delta Pout(TRPN)=P2out(TRPN λ<k>)-P1out(TRPN λ<k>)$ (Step S111).

In the case of $|\Delta A(E)k|-\Delta Pout(TRPN)>0$, the operation returns to Step S108 for monitoring and recording the output P1out(TRPN λ<k>), and then the same procedure is repeated.

In the case of $|\Delta A(E)k|-\Delta Pout(TRPN)\leq 0$, the control is finished (Step S112).

Figure 11A:
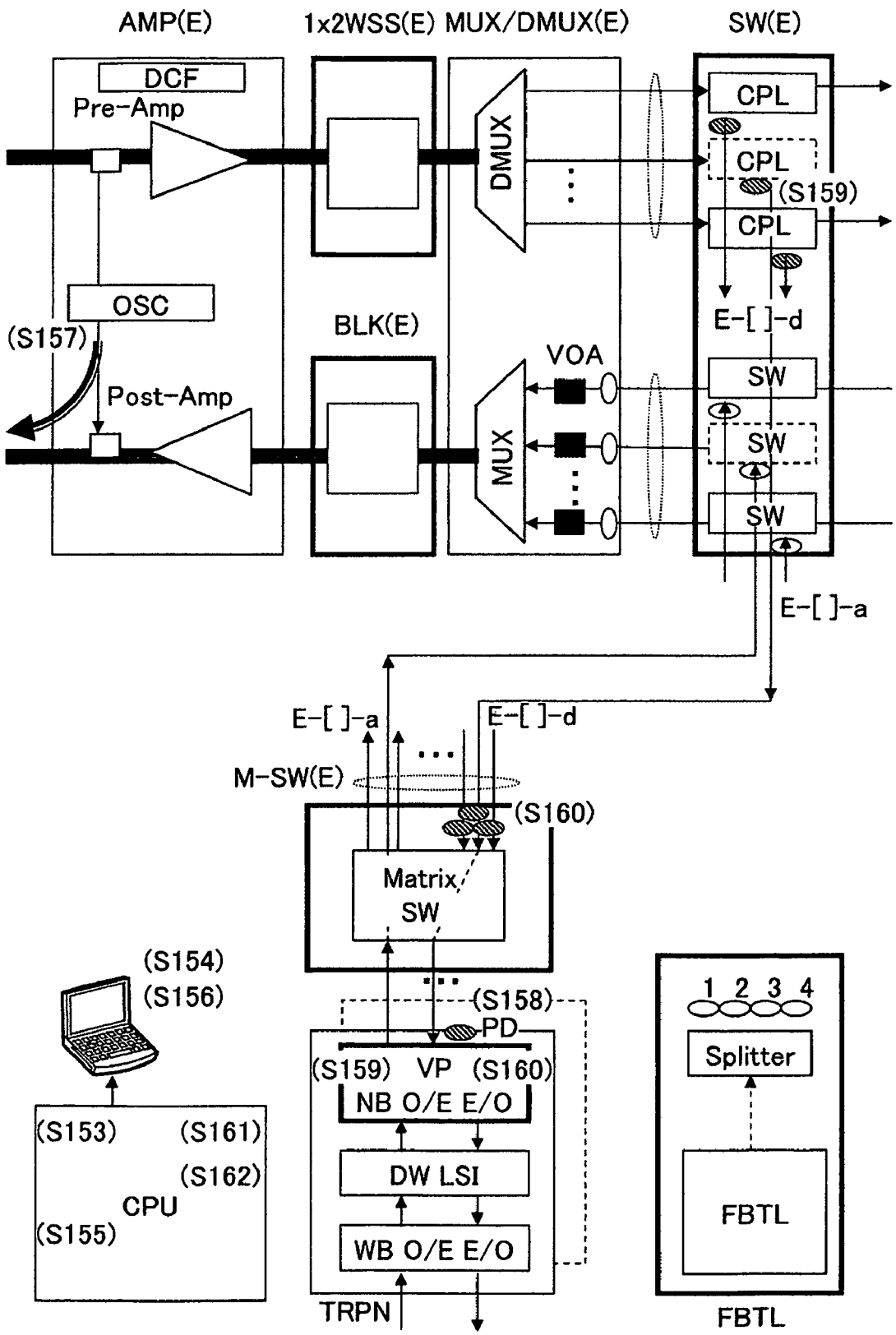
FIGS. 11A and 11B show an example of the operation of measuring the transmission conditions in the drop direction on the East side and controlling, via a wavelength supervisory control process unit, a variable optical attenuator of a wavelength multiplexing/demultiplexing unit of an opposing optical add/drop multiplexer.
Figure 11B:
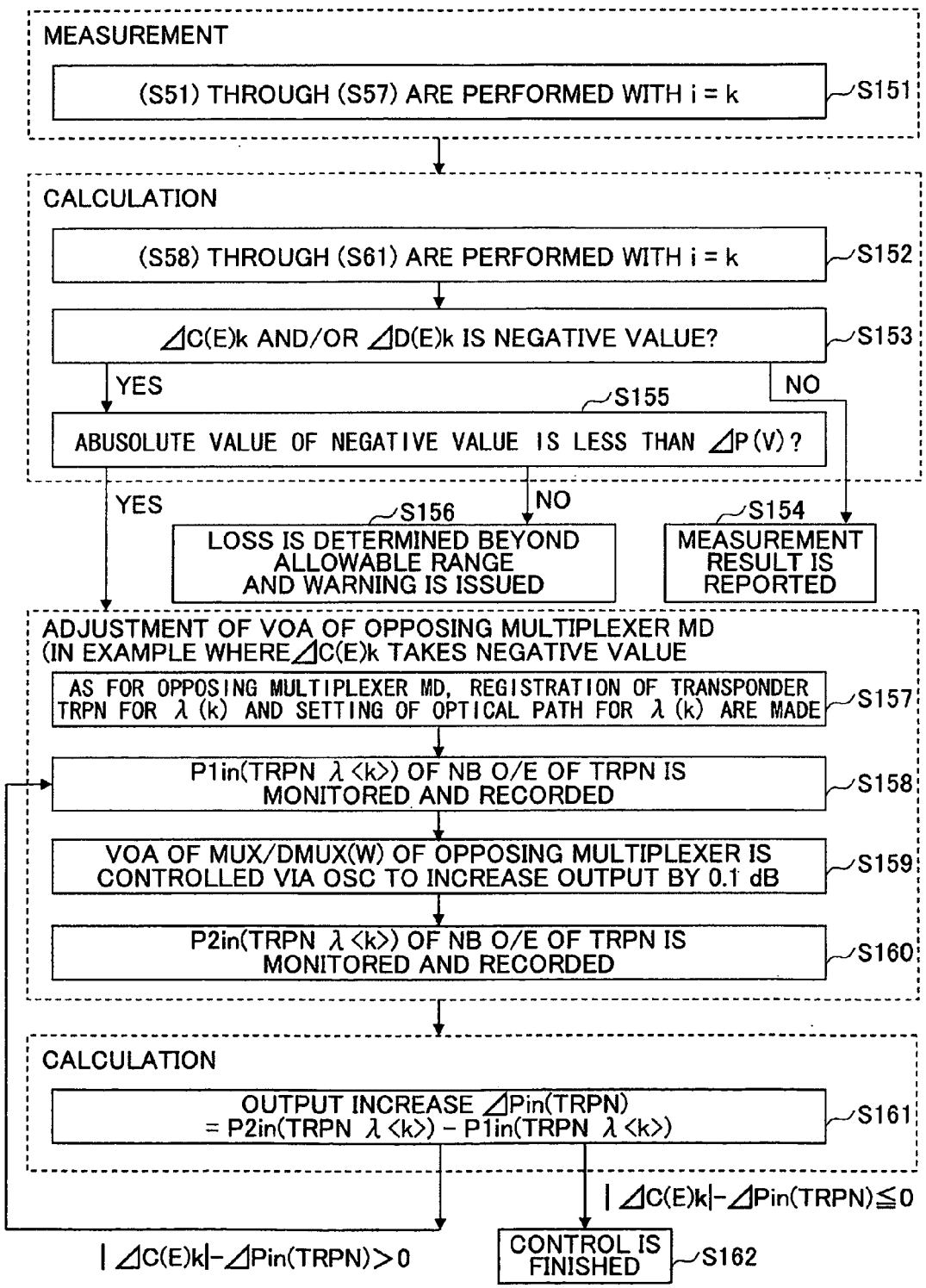

FIGS. 11A and 11B show an example of operation of measuring the transmission condition in the drop direction on the East side and controlling, via a wavelength supervisory control process unit, a variable optical attenuator of a wavelength multiplexing/demultiplexing unit of an opposing optical add/drop multiplexer 1 which is connected to the optical add/drop multiplexer 1. FIG. 11A shows a signal flow within a part related to the operation, and FIG. 10B is a flowchart of the operation.

In this example, the measurements are carried out for an arbitrary wavelength k while the optical add/drop multiplexer 1 is in operation, and the variable optical attenuator VOA of the wavelength multiplexing/demultiplexing unit (MUX/DMUX) of the opposing optical add/drop multiplexer 1 is controlled based on the measurement result via the wavelength supervisory control process unit OSC so as to increase an optical level input to the optical add/drop multiplexer 1. As a result of the measurements, if there is an optical loss, the attenuation value of a variable optical attenuator VOA of the opposing optical add/drop multiplexer 1 is lowered so that the optical output of the transponder TRPN is increased by the sum of a target optical-level difference ($\Delta C(E)k$, for example) and 0.1 dB using loop control, whereby the optical loss in the optical add/drop multiplexer 1 is compensated for. Note however that, in the case where the absolute value of $\Delta C(E)k$, and/or $\Delta D(E)k$, exceeds the adjustment range of the variable optical attenuator VOA of the wavelength multiplexing/demultiplexing unit (MUX/DMUX), $\Delta P(V)$, the optical loss cannot be compensated for by controlling the variable optical attenuator VOA. In such a case, a warning is issued to inform the operator.

According to FIGS. 11A and 11B, first, Steps S51 through S57 of FIGS. 9A and 9B are performed with i=k (Step S151).

Next, Steps S58 through S61 of FIGS. 9A and 9B are performed with i=k (Step S152).

Then, it is determined whether $\Delta C(E)k$ and/or $\Delta D(E)k$ is a negative value (Step S153). If $\Delta C(E)k$ and/or $\Delta D(E)k$ is not a negative value (Step S153: NO), the measurement result is reported to the operator (Step S154).

If $\Delta C(E)k$ and/or $\Delta D(E)k$ is a negative value (Step S153: YES), it is further determined whether the absolute value of the negative value is less than the adjustment tolerance $\Delta P(V)$ of the variable optical attenuator VOA of the wavelength multiplexing/demultiplexing unit (MUX/DMUX) (Step S155). If the absolute value is not less than the VOA adjustment tolerance $\Delta P(V)$ (Step S155: NO), the optical loss is beyond the allowable range and a warning is issued to inform the operator (Step S156).

Assume here that $\Delta C(E)k$ is a negative value. In the case where the absolute value of $\Delta C(E)k$ is less than the VOA adjustment tolerance $\Delta P(V)$ (Step S155: YES), the following process is performed. Regarding the opposing optical add/drop multiplexer 1, the registration of a transponder TRPN for $\lambda(k)$ and the setting of an optical path for $\lambda(k)$ are made (Step S157).

An input P1in(TRPN $\lambda$<k>) of the narrow-band variable-output photoelectric conversion unit VP NB O/E E/O of the transponder TRPN is monitored and recorded (Step S158).

A corresponding variable optical attenuator VOA of the wavelength multiplexing/demultiplexing unit MUX/DMUX (W) of the opposing optical add/drop multiplexer 1 is controlled via the wavelength supervisory control process unit OSC to increase the output power by 0.1 dB (Step S159).

An output P2in(TRPN $\lambda$<k>) of the narrow-band variable-output photoelectric conversion unit VP NB O/E E/O of the transponder TRPN is monitored and recorded (Step S160).

An increase in the output is calculated: $\Delta Pin(TRPN) = P2in(TRPN\ \lambda\text{<k>}) - P1in(TRPN\ \lambda\text{<k>})$ (Step S161).

In the case of $|\Delta C(E)k| - \Delta Pin(TRPN) > 0$, the operation returns to Step S158 for monitoring and recording the input P1in(TRPN $\lambda$<k>), and then the same procedure is repeated.

In the case of $|\Delta C(E)k| - \Delta Pin(TRPN) \leq 0$, the control is finished (Step S162).

Note that although the operation above is described only for the East side, the West side has a structure symmetrical to that on the East side. Also, the operation on the West side is the same as that on the East side.

(b) Second Embodiment

Figure 12:
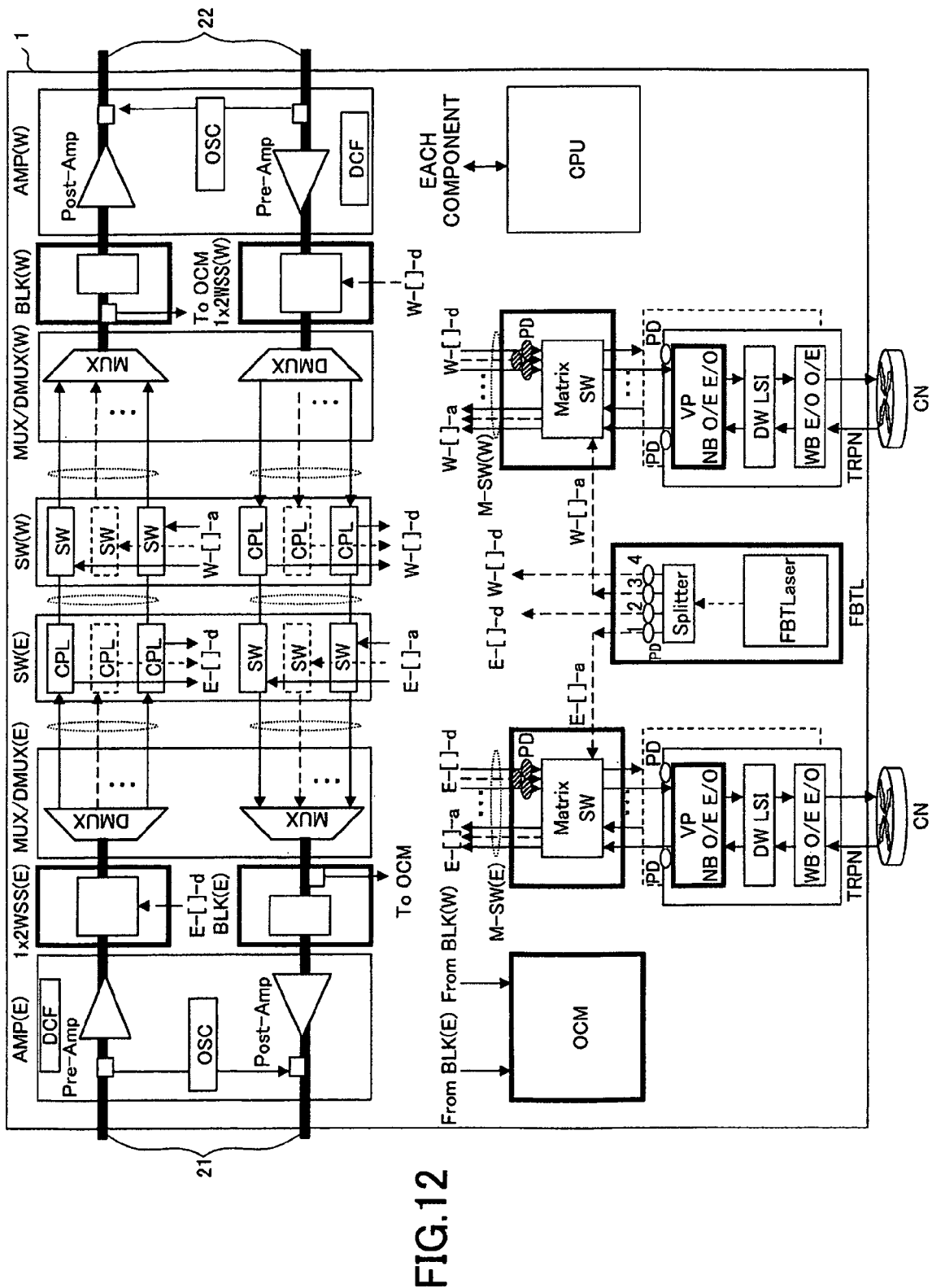
FIG. 12 shows a structural example of an optical add/drop multiplexer according to a second embodiment of the present disclosures.

FIG. 12 shows a structural example of the optical add/drop multiplexer according to the second embodiment of the present disclosures. According to the second embodiment, the optical add/drop multiplexer 1 has a lower-cost structure in which no photodiodes PD are provided in the optical switching units SW(E) and SW(W) and the wavelength multiplexing/demultiplexing units MUX/DMUX(E) and MUX/DMUX(W). That is, instead of measuring the optical level by a photodiode PD, a multiplexed optical signal is measured by an optical channel monitor OCM. FIG. 12 is structurally different from FIG. 3 in that the optical channel monitor OCM is provided, and that an optical signal is input to the optical channel monitor OCM from an input terminal of the wavelength blocker unit BLK(E) or BLK(W).

Figure 13A:
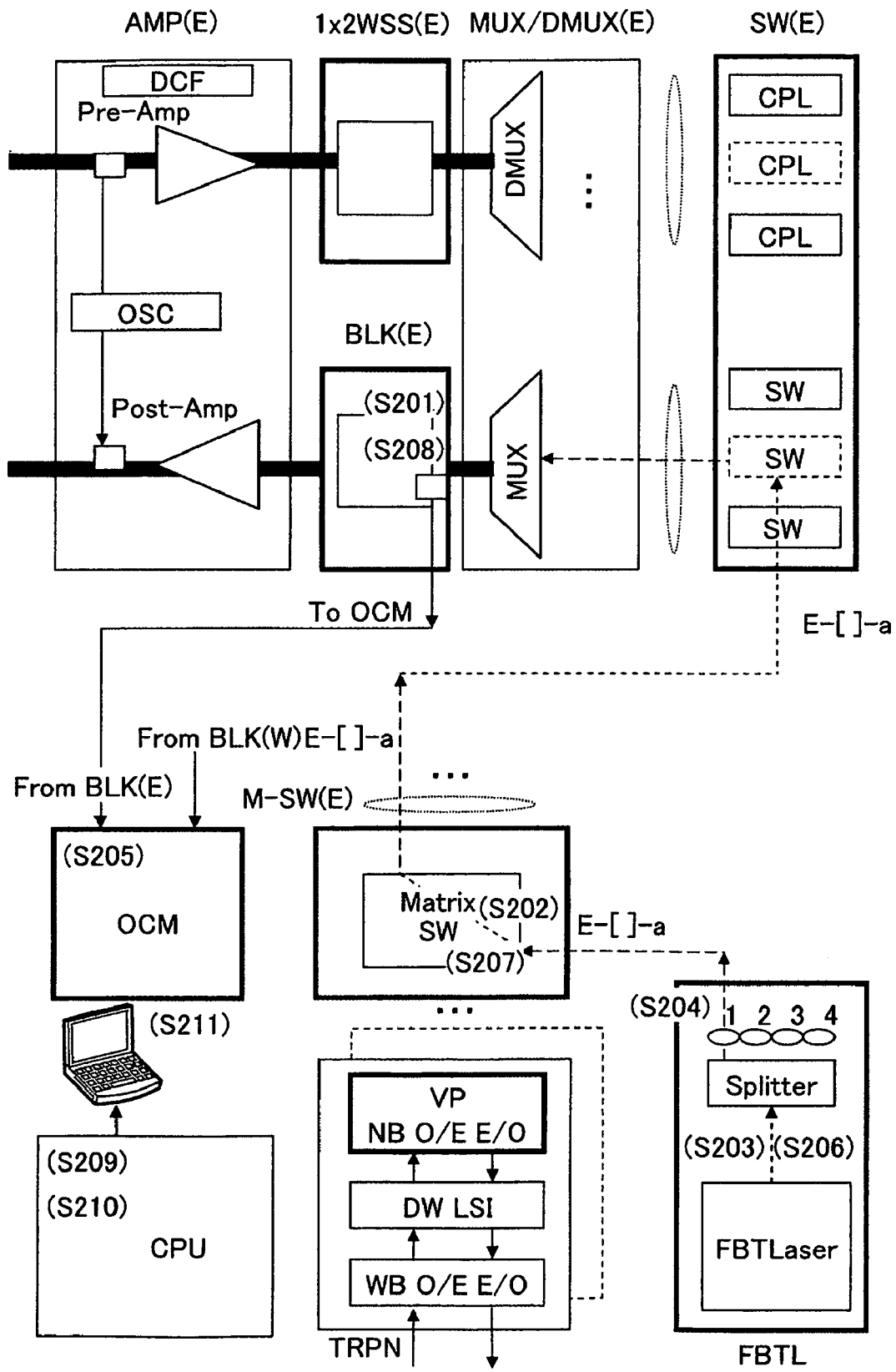
FIGS. 13A and 13B show an example of the operation of measuring the transmission condition in the add direction on the East side.
Figure 13B:
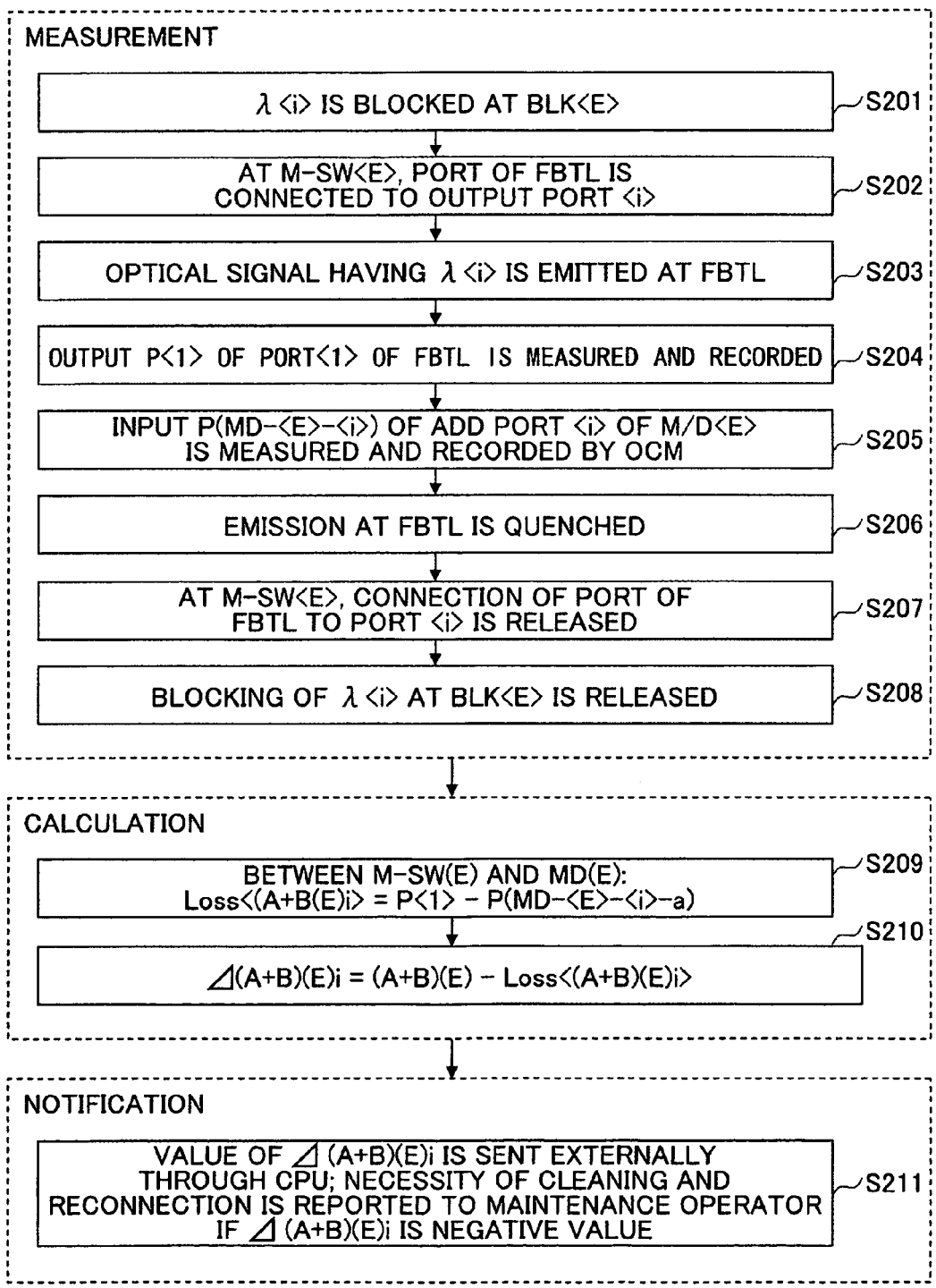

FIGS. 13A and 13B show an example of the operation of measuring the transmission condition in the add direction on the East side. FIG. 13A shows a signal flow within a part related to the operation, and FIG. 13B is a flowchart of the operation.

This example assumes that at the start-up of the optical add/drop multiplexer 1, the wavelengths of a multiplexed optical signal are continuous with no wavelength gaps in any path. For example, if there are forty wavelengths, the transmission measurements are carried out in the order of $\lambda=1, 2, 3, \ldots, i, \ldots, 39$ and 40. FIGS. 13A and 13B show a case of performing the measurements of i-th wavelength optical signal. The following are symbols used in FIGS. 13A and 13B.

(A+B)(E): allowable loss between the matrix switching unit M-SW(E) and the wavelength multiplexing/demultiplexing unit MUX/DMUX(E)

Loss<(A+B)(E)i>: actual loss of the i-th wavelength optical signal between the matrix switching unit M-SW(E) and the wavelength multiplexing/demultiplexing unit MUX/DMUX(E)

$\Delta$(A+B)(E)i: difference between the actual loss of the i-th wavelength optical signal and the allowable loss between the matrix switching unit M-SW(E) and the wavelength multiplexing/demultiplexing unit MUX/DMUX(E)

According to FIGS. 13A and 13B, first, the i-th wavelength is blocked at the wavelength blocker unit BLK(E) (Step S201).

Next, at the matrix switching unit M-SW(E), the port #1 of the full band tunable laser unit FBTL is connected to the port <i> (Step S202).

An i-th wavelength optical signal is emitted at the full band tunable laser unit FBTL (Step S203).

An output P<1> of the port #1 of the full band tunable laser unit FBTL is measured and recorded (Step S204).

An input P(MD-<E>-<i>) of the add port <i> of the wavelength multiplexing/demultiplexing unit MUX/DMUX(E) is measured and recorded by the optical channel monitor OCM (Step S205).

The emission of the i-th wavelength optical signal at the full band tunable laser unit FBTL is quenched (Step S206).

At the matrix switching unit M-SW(E), the connection of the port <i> with the port #1 of the full band tunable laser unit FBTL is released (Step S207).

The blocking of the i-th wavelength at the wavelength blocker unit BLK(E) is released (Step S208).

An actual loss of the i-th wavelength optical signal between the matrix switching unit M-SW(E) and the wavelength multiplexing/demultiplexing unit MUX/DMUX(E) is calculated: Loss<(A+B) (E)i>=P<1>−P(MD−<E>−<i>−a) (Step S209).

A difference between the actual loss of the i-th wavelength optical signal and the allowable loss (A+B) (E) between the matrix switching unit M-SW(E) and the wavelength multiplexing/demultiplexing unit MUX/DMUX(E) is calculated: $\Delta$(A+B)(E)i=(A+B)(E)−Loss<(A+B)(E)i> (Step S210).

Then, the value of $\Delta$(A+B)(E)i is sent externally through the processor CPU, and in the case where $\Delta$(A+B) (E)i is a negative value, the necessity of cleaning and reconnection of the i-th wavelength optical signal is reported to a maintenance operator (Step S211).

The above describes the case of measuring the transmission condition in the add direction on the East side using the optical channel monitor OCM. In a similar manner, measurements for the transmission condition in the drop direction on the East side, optical output adjustment, and control of an opposing optical add/drop multiplexer can be implemented by combining the first embodiment with an idea of measuring losses of two optical paths by the optical channel monitor OCM. In addition, on the West side, these operations are performed in the same manner as those on the East side.

Furthermore, optical loss of each multicore cable connecting the optical switching units SW(E) and SW(W) in FIG. 3 can be measured by measuring optical levels of a signal before and after passing through the optical switching units SW(E) and SW(W).

(c) Application to Other Systems

Figure 1A:
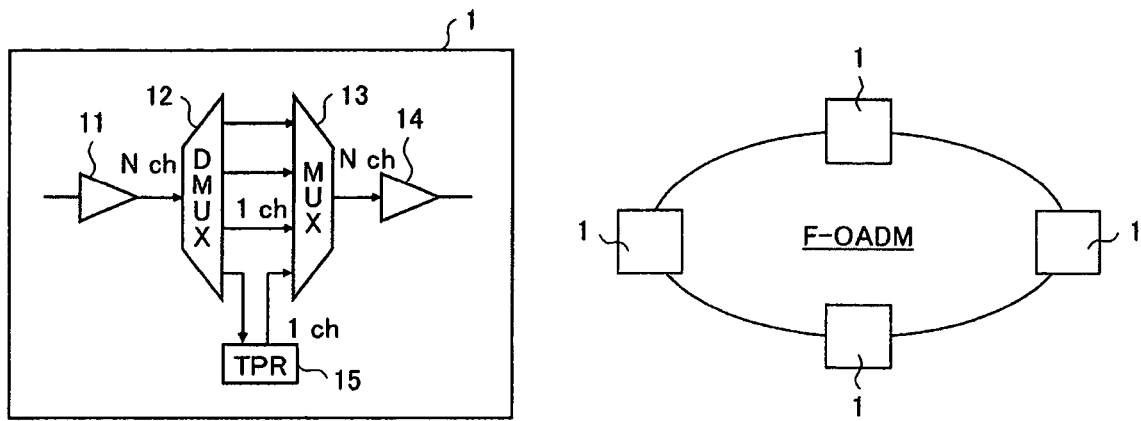
FIGS. 1A through 1C show representative structures of optical add/drop multiplexers.
Figure 1B:
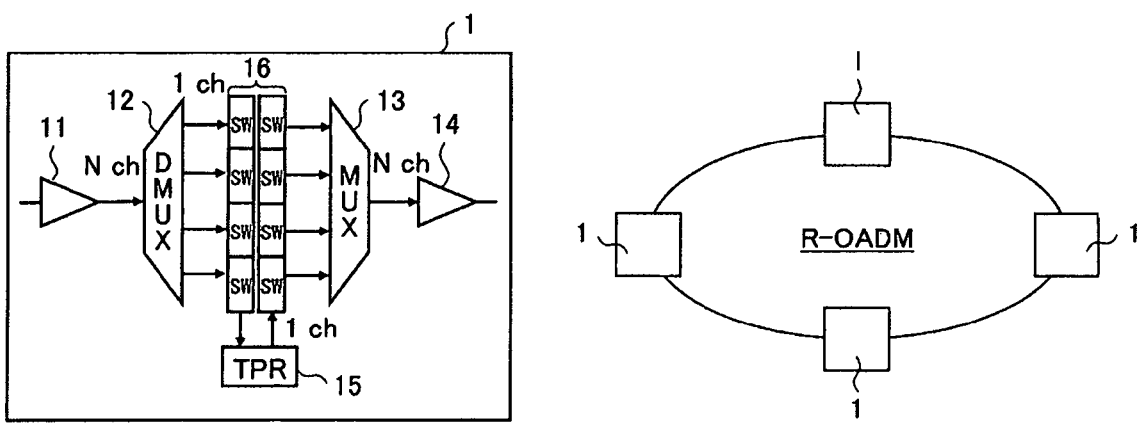
Figure 1C:
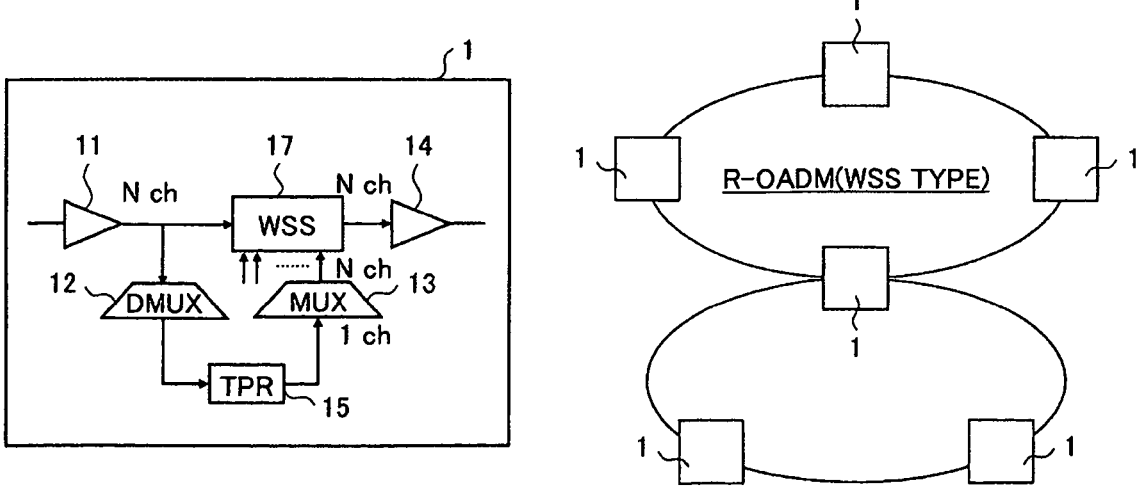

The above embodiments describe an optical add/drop multiplexer based on the R-OADM illustrated in FIG. 1B; however, the idea of measuring, with respect to each wavelength, the optical level of a corresponding optical signal before and after a multicore cable can be applied to an optical add/drop multiplexer based on the F-OADM illustrated in FIG. 1A and an optical add/drop multiplexer based on the R-OADM (WSS type) illustrated in FIG. 1C.

(d) Conclusion

As has been described above, the following advantages can be achieved according to the above embodiments.

(1) The transmission condition within an optical add/drop multiplexer at the initial start-up can be measured both in the add and drop directions, with the multiplexer being in a closed state, whereby it is possible to improve handling of the optical add/drop multiplexer.

(2) The measurements can be made even if the optical add/drop multiplexer is in operation, and the loss in the optical signal transmission can be compensated for by controlling the optical level without connector cleaning, whereby it is possible to improve operability of the optical add/drop multiplexer.

All examples and conditional language used herein are intended for pedagogical purposes to aid the reader in understanding the principles of the present disclosures and the concepts contributed by the inventor to furthering the art, and are to be construed as being without limitation to such specifically recited examples and conditions, nor does the organization of such examples in the specification relate to a showing of the superiority or inferiority of the present disclosures. Although the embodiments of the present disclosures have been described in detail, it should be understood that various changes, substitutions, and alterations could be made hereto without departing from the spirit and scope of the present disclosures.

What is claimed is:

1. An optical add/drop multiplexing device for demultiplexing a first multiplexed optical signal input via a first optical cable into a plurality of optical signals according to wavelengths, dropping one or more of the demultiplexed optical signals to a transponder, adding one or more optical signals output from the transponder to the demultiplexed optical signals, multiplexing the demultiplexed optical signals into a second multiplexed optical signal, and outputting the second multiplexed optical signal to a second optical cable, the optical add/drop multiplexing device comprising:
    an injecting unit configured to inject one of measurement optical signals, each of whose wavelengths corresponds to a wavelength of a different one of the demultiplexed optical signals, into a core of a multicore cable within the optical add/drop multiplexing device, the core being used to transmit one of the demultiplexed optical signals which has the same wavelength as the one of the measurement optical signals;
    a preventing unit configured to prevent the one of the measurement optical signals from emanating toward the second optical cable;
    a measuring unit configured to measure optical levels of the one of the measurement optical signals at positions before and after the corresponding core of the multiple cable;
    a calculating unit configured to calculate, for the wavelength of the one of the measurement optical signals, optical loss of the corresponding core of the multicore cable, based on the measured optical levels; and
    an informing unit configured to report the calculated optical loss.

2. The optical add/drop multiplexing device as claimed in claim 1, further comprising a controlling unit configured to control an optical output level of an optical signal output from the transponder based on the calculated optical loss of the corresponding core of the multicore cable in the add direction.

3. The optical add/drop multiplexing device as claimed in claim 1, further comprising a controlling unit configured to control, based on the calculated optical loss of the corresponding core of the multicore cable in the drop direction, an optical output level of the corresponding optical signal output from an opposing optical add/drop multiplexing device which is connected to the optical add/drop multiplexing device by the first optical cable.

4. A within-device optical level measurement method used on an optical add/drop multiplexing device for demultiplexing a first multiplexed optical signal input via a first optical cable into a plurality of optical signals according to wavelengths, dropping one or more of the demultiplexed optical signals to a transponder, adding one or more optical signals output from the transponder to the demultiplexed optimal signals, multiplexing the demultiplexed optical signals into a second multiplexed optical signal, and outputting the second multiplexed optical signal to a second optical cable, the within-device optical level measurement method comprising the steps of:
    injecting one of measurement optical signals, each of whose wavelengths corresponds to a wavelength of a different one of the demultiplexed optical signals, into a core of a multicore cable within the optical add/drop multiplexing device, the core being used to transmit one of the demultiplexed optical signals which has the same wavelength as the one of the measurement optical signals;
    preventing the one of the measurement optical signals from emanating toward the second optical cable;
    measuring optical levels of the one of the measurement optical signals at positions before and after the corresponding core of the multiple cable;
    calculating, for the wavelength of the one of the measurement optical signals, optical loss of the corresponding core of the multicore cable, based on the measured optical levels; and
    reporting the calculated optical loss.

5. The within-device optical level measurement method as claimed in claim 4, further comprising a step of controlling an optical output level of an optical signal output from the transponder based on the calculated optical loss of the corresponding core of the multicore cable in the add direction.

6. The within-device optical level measurement method as claimed in claim 4, further comprising a step of controlling, based on the calculated optical loss of the corresponding core of the multicore cable in the drop direction, an optical output level of the corresponding optical signal output from an opposing optical add/drop multiplexing device which is connected to the optical add/drop multiplexing device by the first optical cable.

* * * * *

UNITED STATES PATENT AND TRADEMARK OFFICE
CERTIFICATE OF CORRECTION

| | | |
|---|---|---|
| PATENT NO. | : 8,098,988 B2 | |
| APPLICATION NO. | : 12/318321 | |
| DATED | : January 17, 2012 | |
| INVENTOR(S) | : Hiroaki Nakazato et al. | |

It is certified that error appears in the above-identified patent and that said Letters Patent is hereby corrected as shown below:

IN THE CLAIMS:

Column 16, Line 24 (Approx.), In Claim 4, delete "optimal" and insert -- optical --, therefor.

Signed and Sealed this
Seventeenth Day of April, 2012

David J. Kappos
*Director of the United States Patent and Trademark Office*